(12) United States Patent
Makii

(10) Patent No.: US 8,848,097 B2
(45) Date of Patent: Sep. 30, 2014

(54) IMAGE PROCESSING APPARATUS, AND METHOD, FOR PROVIDING SPECIAL EFFECT

(75) Inventor: Tatsuo Makii, Tokyo (JP)

(73) Assignee: Sony Corporation (JP)

( * ) Notice: Subject to any disclaimer, the term of this patent is extended or adjusted under 35 U.S.C. 154(b) by 927 days.

(21) Appl. No.: 12/384,304

(22) Filed: Apr. 2, 2009

(65) Prior Publication Data

US 2009/0262218 A1 Oct. 22, 2009

(30) Foreign Application Priority Data

Apr. 7, 2008 (JP) ................ P2008-099599

(51) Int. Cl.
*H04N 5/225* (2006.01)
*H04N 5/262* (2006.01)
*H04N 5/232* (2006.01)
*G06T 11/00* (2006.01)
*G03B 15/08* (2006.01)

(52) U.S. Cl.
CPC ............. *H04N 5/232* (2013.01); *H04N 5/2625* (2013.01); *G06T 11/00* (2013.01); *G03B 15/08* (2013.01); *H04N 5/23245* (2013.01); *H04N 5/53232* (2013.01)
USPC .......................................... 348/362; 348/239

(58) Field of Classification Search
USPC .................. 348/220.1–222.1, 239, 362–364
See application file for complete search history.

(56) References Cited

U.S. PATENT DOCUMENTS 5,801,773 A * 9/1998 Ikeda ........................ 348/229.1
5,828,793 A * 10/1998 Mann ............................ 382/284
6,529,640 B1 * 3/2003 Utagawa et al. ............... 382/284
7,295,232 B2   11/2007 Washisu
7,756,411 B2 * 7/2010 Tanaka et al. ................. 396/155
8,159,559 B2 * 4/2012 Senba ......................... 348/229.1
2006/0007327 A1 * 1/2006 Nakamura et al. ............ 348/239
2006/0062433 A1   3/2006 Ikeda
2006/0127084 A1   6/2006 Okada
2006/0250515 A1 * 11/2006 Koseki et al. ................. 348/362
2007/0229699 A1   10/2007 Hamamura et al.

(Continued)

FOREIGN PATENT DOCUMENTS

JP    10164472 A    6/1998
JP    10-290450 A    10/1998

(Continued)

OTHER PUBLICATIONS

European Search Report, EP 09 15 6778, dated Jun. 29, 2009.

(Continued)

*Primary Examiner* — Twyler Haskins
*Assistant Examiner* — Carramah J Quiett
(74) *Attorney, Agent, or Firm* — Lerner, David, Littenberg, Krumholz & Mentlik, LLP

(57) ABSTRACT

An image processing apparatus includes an image obtaining unit configured to perform an image obtaining operation to obtain a plurality of frames of image data having continuity in time, a storage unit configured to temporarily store each of the plurality of frames of image data obtained by the image obtaining unit during the image obtaining operation, and an arithmetic operation control unit configured to perform an image combination process using the plurality of frames of image data sequentially stored in the storage unit during the image obtaining operation to generate combined-image data, the combined-image data being used as data used for display.

18 Claims, 23 Drawing Sheets

(56) References Cited

U.S. PATENT DOCUMENTS

| | | | |
|---|---|---|---|
| 2008/0143841 A1* | 6/2008 | Tico et al. | 348/208.99 |
| 2009/0021594 A1* | 1/2009 | Tsuda et al. | 348/222.1 |
| 2009/0091633 A1* | 4/2009 | Tamaru | 348/208.14 |
| 2009/0091645 A1* | 4/2009 | Trimeche et al. | 348/273 |
| 2009/0231465 A1* | 9/2009 | Senba | 348/229.1 |

FOREIGN PATENT DOCUMENTS

| | | |
|---|---|---|
| JP | 11075118 A | 3/1999 |
| JP | 2003069897 A | 3/2003 |
| JP | 2004-219765 A | 8/2004 |
| JP | 2005117395 A | 4/2005 |
| JP | 2005-354166 A | 12/2005 |
| JP | 2006-086933 A | 3/2006 |
| JP | 2006060339 A | 3/2006 |
| JP | 2006-174069 A | 6/2006 |
| JP | 2006253810 A | 9/2006 |
| JP | 2007189639 A | 7/2007 |

OTHER PUBLICATIONS

Office Action from Japanese Application No. 2008-099599, dated Mar. 23, 2010.

* cited by examiner

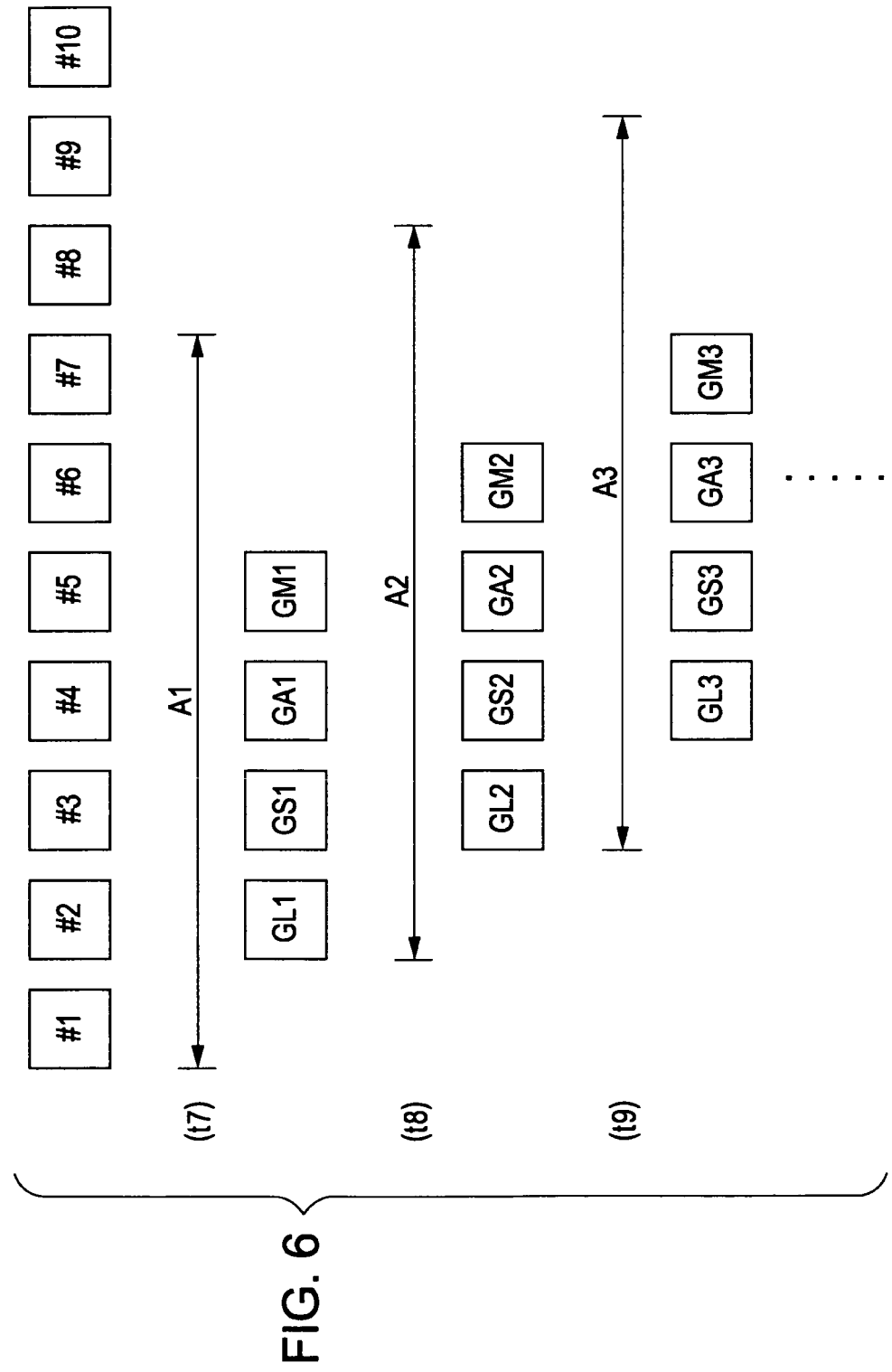

FIG. 7
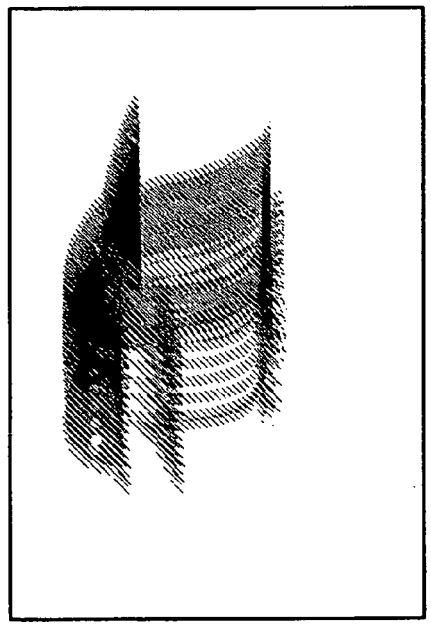
COMBINED IMAGE
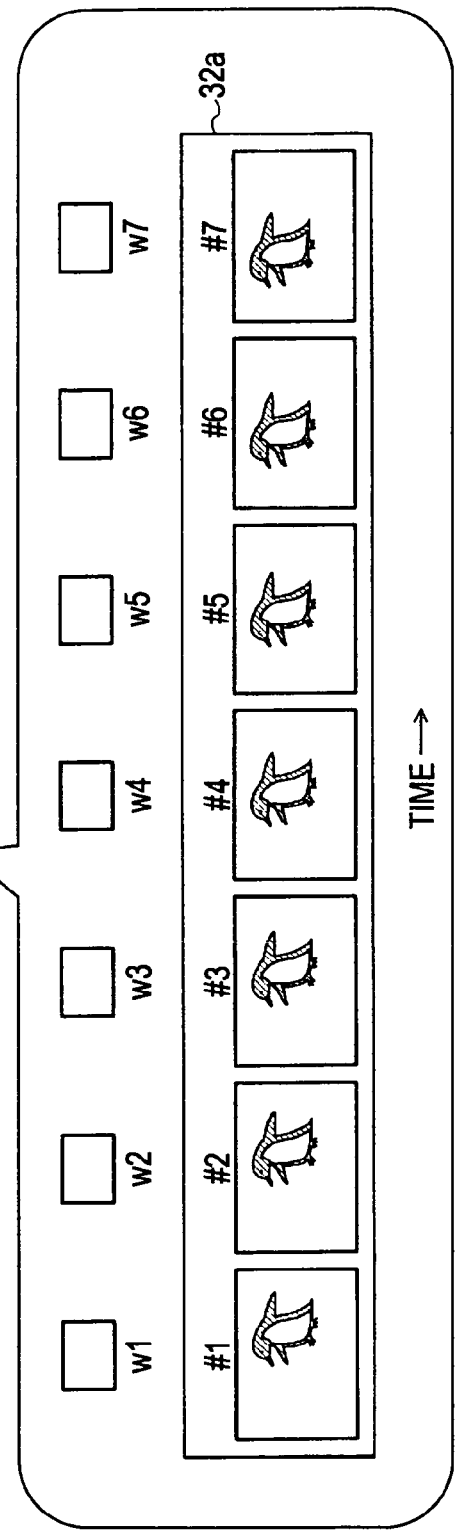

FIG. 9
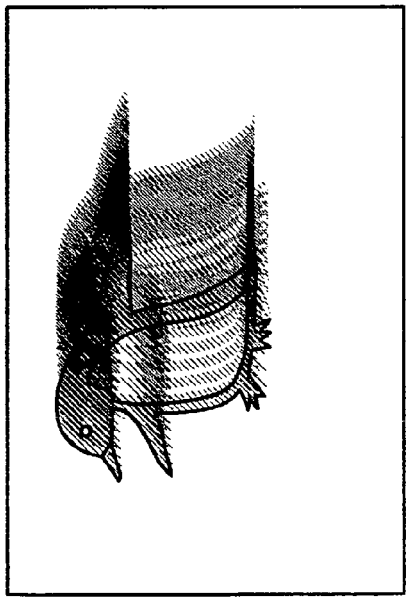
COMBINED IMAGE
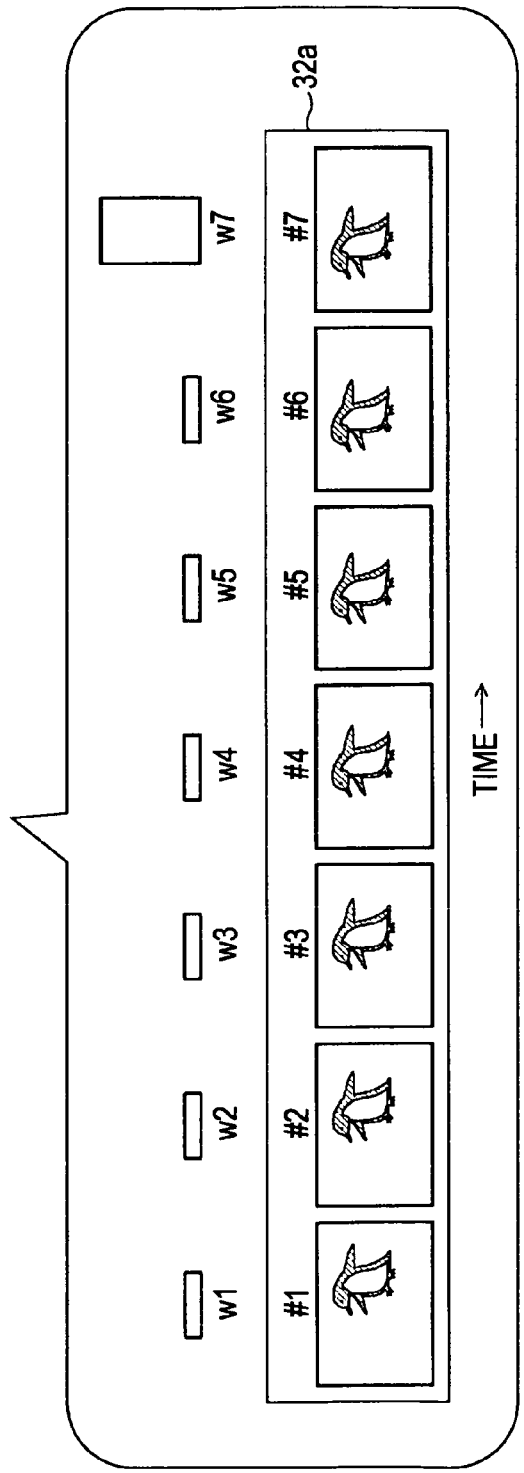
SECOND-CURTAIN SYNCHRONIZATION EFFECT
TIME →

FIG. 10
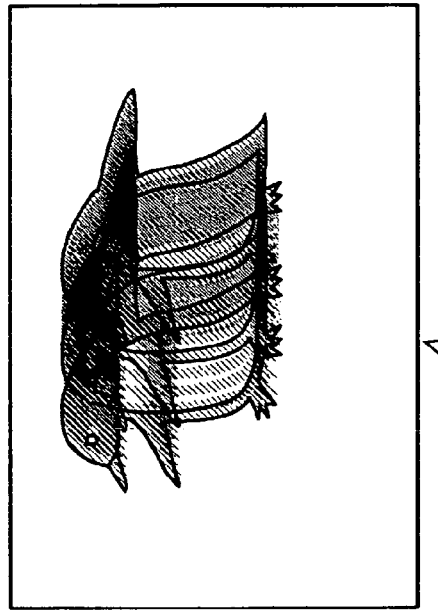
COMBINED IMAGE
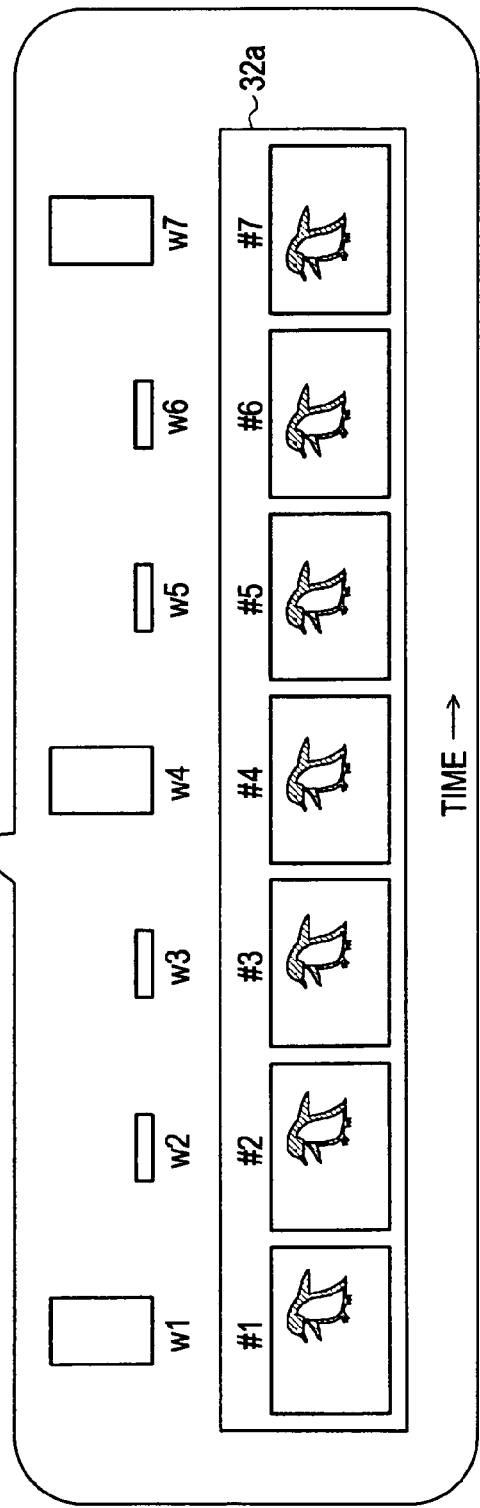
MULTI-FLASH EFFECT
TIME →

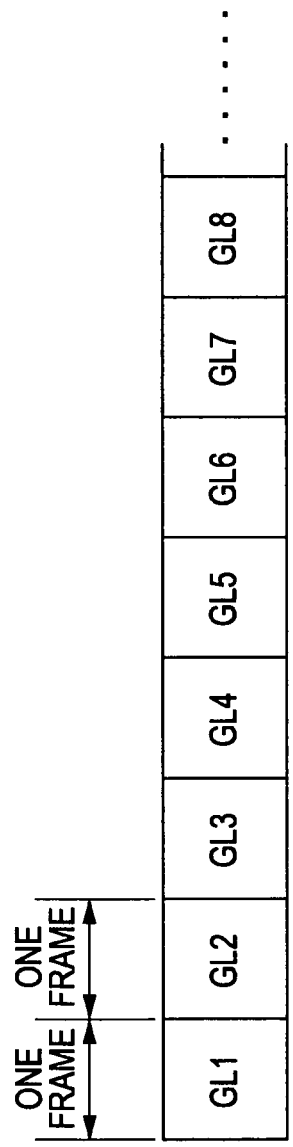
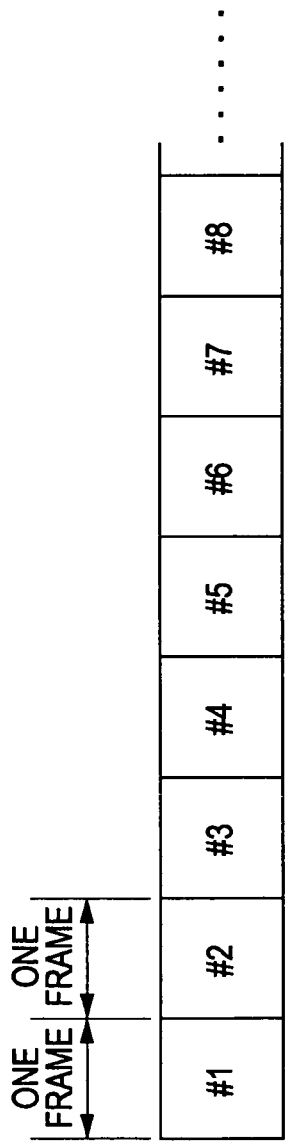

IMAGE PROCESSING APPARATUS, AND METHOD, FOR PROVIDING SPECIAL EFFECT

The present application claims priority from Japanese Patent Application No. JP 2008-099599, filed in the Japanese Patent Office on Apr. 7, 2008, the entire content of which is incorporated herein by reference.

BACKGROUND OF THE INVENTION

1. Field of the Invention

The present invention relates to an image processing apparatus, an image processing method, and a program for image processing.

2. Description of the Related Art

A long-time exposure technique is common as a film-based photography or image capture technique. In this technique, exposure is continuously performed for a certain period of time such as several seconds to several tens of seconds or even over several tens of minutes.

The long-time exposure technique is also used to provide photographic representations as well as to adjust the brightness of a subject.

For example, night scenes are photographed with a long exposure time. Since the amount of light is low, the exposure time is increased to collect a sufficient amount of light to obtain shots of night scenes.

The long-time exposure technique may also be used for other purposes. For example, the aperture is intentionally set low or the image capture sensitivity is reduced to represent the motion of a subject or focus on a stationary object among moving objects.

A digital camera designed to perform long-time exposure by adding a plurality of images after an image capture operation is disclosed in Japanese Unexamined Patent Application Publication No. 2005-354166.

Photographic techniques such as using a flash (flashlight device) during long-time exposure to achieve various effects such as first-curtain synchronization, second-curtain synchronization, and multi-flash are also common.

SUMMARY OF THE INVENTION

However, it is difficult for users to obtain their desired images as captured images with special image effects applied such as the long-time exposure, the first-curtain synchronization, the second-curtain synchronization, and the multi-flash effects.

It is necessary to determine appropriate settings such as exposure settings including the exposure time and the shutter speed, a flash light emission time, and the amount of flash light to obtain satisfactory images as images with the special effects described above. It is necessary for users to determine such settings according to their experience and intuition, which is difficult in practice for inexperienced users.

It is therefore desirable to allow general users who are not experts to easily obtain still images similar to images obtained by long-time exposure or images with image effects using long-time exposure such as the first-curtain synchronization, second-curtain synchronization, and multi-flash effects, by performing image capture or the like.

In an embodiment of the present invention, an image processing apparatus includes an image obtaining unit configured to perform an image obtaining operation to obtain a plurality of frames of image data having continuity in time, a storage unit configured to temporarily store each of the plurality of frames of image data obtained by the image obtaining unit during the image obtaining operation, and an arithmetic operation control unit configured to perform an image combination process using the plurality of frames of image data sequentially stored in the storage unit during the image obtaining operation to generate combined-image data, the combined-image data being used as data used for display.

The arithmetic operation control unit may perform, in accordance with a recording operation input, a process of recording combined-image data obtained at a time of the recording operation input onto a recording medium as still-image data.

The arithmetic operation control unit may generate combined-image data using a predetermined number of frames of image data including a most recent frame of image data among a plurality of frames of image data that are stored for each predetermined period of time.

The arithmetic operation control unit may perform a combination process by assigning an equal weighting coefficient to frames of image data to be subjected to the combination process.

The arithmetic operation control unit may also perform a combination process by assigning a high weighting coefficient to a most recent frame of image data among frames of image data to be subjected to the combination process and assigning a low weighting coefficient to a remaining frame of image data.

The arithmetic operation control unit may also perform a combination process by assigning a high weighting coefficient to an oldest frame of image data among frames of image data to be subjected to the combination process and assigning a low weighting coefficient to a remaining frame of image data.

The arithmetic operation control unit may also perform a combination process by periodically assigning a high weighting coefficient and a low weighting coefficient to frames of image data to be subjected to the combination process.

The arithmetic operation control unit may perform an image combination process using the plurality of frames of image data sequentially stored in the storage unit during the image obtaining operation to generate a plurality of types of combined-image data, the generated plurality of types of combined-image data being used as data used for display.

The arithmetic operation control unit may perform, in accordance with a recording operation input, a process of recording at least some of a plurality of types of combined-image data generated at a time of the recording operation input onto a recording medium as still-image data.

The arithmetic operation control unit may perform an image combination process using the plurality of frames of image data sequentially stored in the storage unit during the image obtaining operation to generate combined-image data, and records the generated combined-image data onto a recording medium as image data of one of frames forming a moving image.

The arithmetic operation control unit may use the recorded combined-image data as data used for display.

The image obtaining unit may include an image capture unit configured to perform an image capture operation to obtain a plurality of frames of image data having continuity in time.

Alternatively, the image obtaining unit may include a playback unit configured to perform a playback operation to obtain a plurality of frames of image data having continuity in time.

Alternatively, the image obtaining unit may include a receiving unit configured to perform a receiving operation to obtain a plurality of frames of image data having continuity in time.

The image processing apparatus may further include a display unit configured to display an image based on the combined-image data generated by the arithmetic operation control unit.

The image processing apparatus may further include a sending unit configured to send the combined-image data generated by the arithmetic operation control unit.

The arithmetic operation control unit may generate combined-image data using a predetermined number of frames of image data including a most recent frame of image data among a plurality of frames of image data that are stored for each predetermined period of time, and uses the generated combined-image data as data used for display.

In another embodiment of the present invention, an image processing method includes the steps of obtaining a plurality of frames of image data having continuity in time; temporarily storing each of the plurality of obtained frames of image data; performing an image combination process using the plurality of sequentially stored frames of image data to generate combined-image data; and outputting the combined-image data as data used for display.

In still another embodiment of the present invention, a program for causing a computer to execute an image processing method, the image processing method including the steps of obtaining a plurality of frames of image data having continuity in time; temporarily storing each of the plurality of obtained frames of image data; performing an image combination process using the plurality of sequentially stored frames of image data to generate combined-image data; and outputting the combined-image data as data used for display.

According to the embodiments of the present invention, for example, combined-image data is generated by combining images of frames sequentially obtained as display data representing captured monitor images, playback monitor images, or the like during the capture of subject images, video playback, or the like for a predetermined frame period. The combined-image data represents an image to which the long-time exposure effect is applied or an image to which an effect such as the first-curtain synchronization effect, the second-curtain synchronization effect, or the multi-flash effect is applied.

Then, for example, the most recent frame and a predetermined number of preceding frames are combined every one-frame period to produce an image of one frame to be displayed. This process is continuously performed to provide display of an image in which combined-image data obtained in each frame period represents one frame in a moving image. In other words, images with the long-time exposure effect are displayed in a movie fashion as monitor images displayed during image capture or playback.

With the display of a moving image of such a special effect, a user can view an image that will be produced by applying a special image effect in real time during image capture or playback. For example, the user can wait for a good shutter release opportunity while monitoring an image to which such a special effect is applied.

In accordance with a user's recording operation such as a shutter operation, combined-image data obtained at the time of shutter release is recorded onto a recording medium. Therefore, the user can obtain an image of a desired scene with a desired special effect.

The image processing apparatus and the image processing method according to the embodiments of the present invention can be implemented in various apparatuses including an image capture apparatus such as a digital still camera, and an information processing apparatus such as a personal computer.

According to the embodiments of the present invention, for example, images to which effects such as the long-time exposure effect, the first-curtain synchronization effect, the second-curtain synchronization effect, and the multi-flash effect are applied are displayed during image capture (when a user is looking for a shooting opportunity) or during playback. This allows the user to actually view an image that will be obtained as a result of applying the special effect or an image that looks like in real time. The user performs a recording operation (a shutter operation and a capture operation) when a desired scene appears, thereby obtaining an image with the desired effect, which has been actually viewed, as a still image.

Therefore, image representations as still images, which may be achievable only by experts in the related art, can be readily and easily obtained by general users. For example, enhanced photographic representations or more creative photographic representations can be promoted.

Further, each combined image is recorded as image data of one of frames forming a moving image, thus allowing the recording of special moving image to which the long-time exposure effect or the like is applied. Therefore, moving image recording, which is not achieved in the related art, can be readily achieved by general users.

BRIEF DESCRIPTION OF THE DRAWINGS

FIG. 6 is a diagram describing a combination process according to the embodiment;

FIG. 7 is a diagram describing a combination process with the long-time exposure effect according to the embodiment;

FIG. 9 is a diagram describing a combination process with the second-curtain synchronization effect according to the embodiment;

FIG. 10 is a diagram describing a combination process with the multi-flash effect according to the embodiment;

FIGS. 20A and 20B are diagrams describing a special moving-image capture mode according to the embodiment;

DESCRIPTION OF THE PREFERRED EMBODIMENTS

An embodiment of the present invention will be described hereinafter in the following order:

1. Structure of Image Capture Apparatus
2. Exemplary Operation in Live-Image Combination Mode
3. Other Exemplary Operation of Live-Image Combination Mode
4. Exemplary Operation in Special Moving-Image Capture Mode
5. Application Example to Information Processing Apparatus 1. Structure of Image Capture Apparatus The structure of an image capture apparatus according to an embodiment of the present invention will now be described in the context of the structure of a digital still camera with reference to FIGS. 1 to 2B.

Figure 2A:
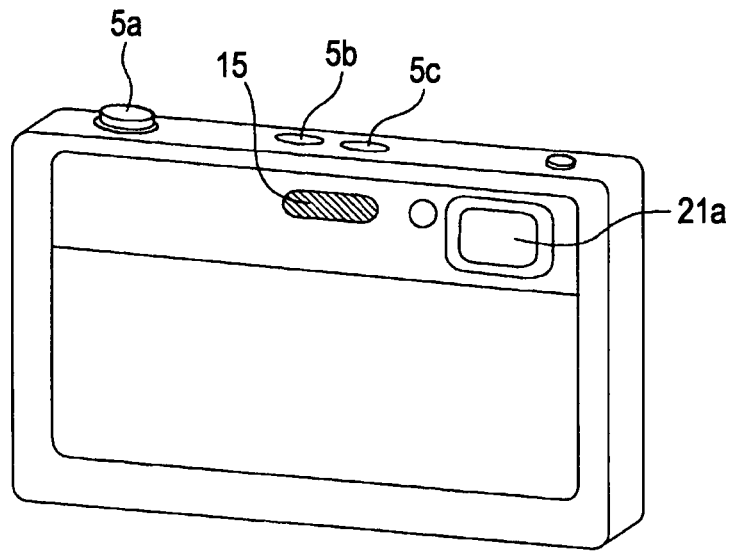
FIGS. 2A and 2B are external front and rear views of the image capture apparatus according to the embodiment, respectively.
Figure 2B:
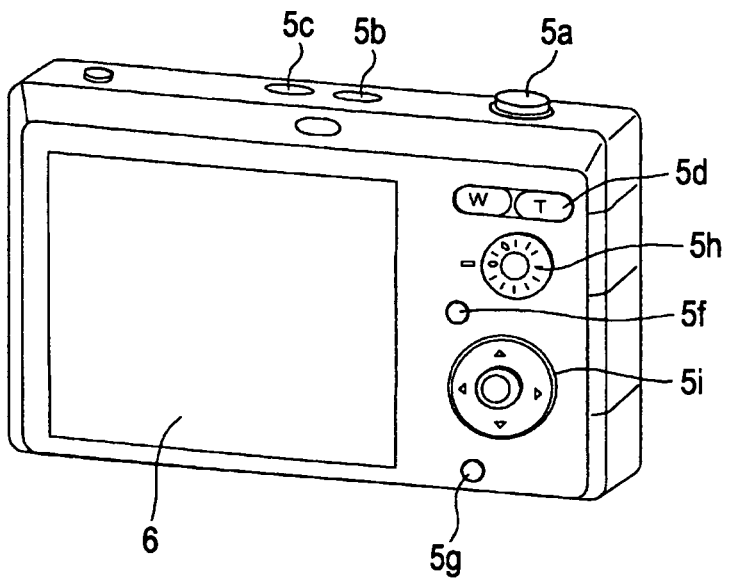

FIGS. 2A and 2B are external front and rear views of an image capture apparatus 1 according to an embodiment of the present invention, respectively. As shown in FIGS. 2A and 2B, the image capture apparatus 1 may be, for example, a digital still camera which a general user who is not an expert usually uses.

The image capture apparatus 1 includes an image capture lens unit 21a and a flash light emitting unit 15 on a front side thereof, and a display panel 6 on a rear side thereof. The display panel 6 may be a liquid crystal panel, an organic electroluminescent (EL) panel, or the like. The image capture apparatus 1 further includes operators at appropriate locations which are used for user operations. For example, operation keys 5a, 5b, 5c, 5d, 5f, and 5g serve as keys for providing various operation functions, including a shutter operation key, a mode operation key, a wide-angle/telephoto operation key, a menu operation key, an exposure correction instruction key, and a playback key. Other operators including a dial operation unit 5h and a cross key 5i are also disposed. The dial operation unit 5h is used for selection or the like of, for example, an image capture mode. The cross key 5i is used for various operations such as selection/setting of an operation menu item displayed on the display panel 6.

An example structure of the image capture apparatus 1 will be described with reference to, for example, FIG. 1.

Figure 1:
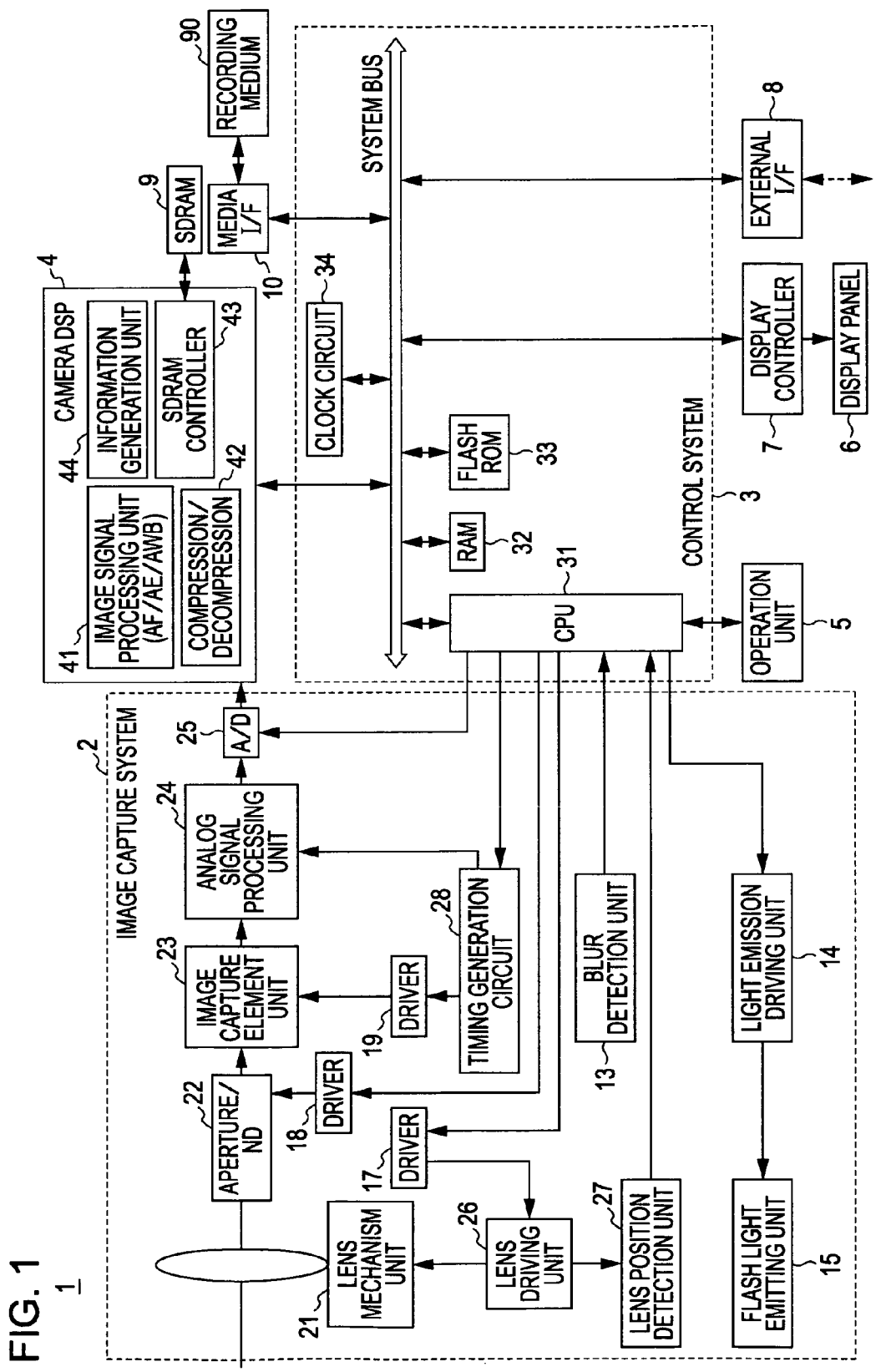
FIG. 1 is a block diagram of an image capture apparatus according to an embodiment of the present invention.

As shown in FIG. 1, the image capture apparatus 1 includes an image capture system 2, a control system 3, a camera digital signal processor (DSP) 4, an operation unit 5, the display panel 6, a display controller 7, an external interface (I/F) 8, a synchronous dynamic random access memory (SDRAM) 9, and a media interface 10.

The image capture system 2 is configured to execute an image capture operation. The image capture system 2 includes a lens mechanism unit 21, an aperture/neutral density (ND) filter mechanism 22, an image capture element unit 23, an analog signal processing unit 24, an analog-to-digital (A/D) conversion unit 25, a lens driving unit 26, a lens position detection unit 27, a timing generation circuit 28, a blur detection unit 13, a light emission driving unit 14, the flash light emitting unit 15, a lens driver 17, an aperture/ND driver 18, and an image capture element driver 19.

Incident light from a subject is directed into the image capture element unit 23 through the lens mechanism unit 21 and the aperture/ND filter mechanism 22.

The lens mechanism unit 21 is incorporated in the image capture lens unit 21a shown in FIG. 2A, and has a plurality of optical lenses including a cover lens, a focus lens, and a zoom lens. The lens driving unit 26 serves as a lens shifting mechanism for shifting the focus lens or zoom lens along an optical axis. When drive power is applied by using the lens driver 17, the lens driving unit 26 shifts the focus lens or zoom lens. The lens driver 17 is controlled by a central processing unit (CPU) 31, which will be described below, to execute focus control or zoom operations.

The aperture/ND filter mechanism 22 includes an aperture mechanism and an ND filter mechanism that is inserted into a lens optical system to attenuate (adjust) the amount of incident light. The aperture/ND filter mechanism 22 is configured to adjust the light intensity.

The aperture/ND driver 18 adjusts the amount of incident light by opening and closing the aperture mechanism. The aperture/ND driver 18 also adjusts the amount of incident light by inserting and removing an ND filter along the optical axis of the incident light. The CPU 31 controls the aperture/ND driver 18 to drive the aperture mechanism or the ND filter to control the amount of incident light (or perform exposure adjustment control).

The light flux coming from the subject is transmitted through the lens mechanism unit 21 and the aperture/ND filter mechanism 22, and a subject image is formed on the image capture element unit 23.

The image capture element unit 23 photoelectrically converts the formed subject image, and outputs a captured image signal corresponding to the subject image.

The image capture element unit 23 has a rectangular image-capture area formed of a plurality of pixels, and sequentially outputs image signals, each of which is an analog signal corresponding to an amount of electric charge accumulated in one of the pixels, to the analog signal processing unit 24 on a pixel-by-pixel basis. The image capture element unit 23 may be implemented by, for example, a charge coupled device (CCD) sensor array, a complementary metal oxide semiconductor (CMOS) sensor array, or the like.

The analog signal processing unit 24 includes internal circuits such as a correlated double sampling (CDS) circuit and an automatic gain control (AGC) circuit. The analog signal processing unit 24 performs a predetermined analog process on the image signal input from the image capture element unit 23.

The A/D conversion unit 25 converts the analog signal processed by the analog signal processing unit 24 into a digital signal, and supplies the digital signal to the camera DSP 4.

The timing generation circuit 28 is controlled by the CPU 31 to control the timings of the operations of the image capture element unit 23, the analog signal processing unit 24, and the A/D conversion unit 25.

Specifically, the timing generation circuit 28 supplies signals for controlling the timing of the image capture operation of the image capture element unit 23 to the image capture element unit 23 through the image capture element driver 19, such as an exposure/electric-charge-read timing signal, a timing signal for providing an electronic shutter function, a transfer clock signal, and a synchronization signal according to a frame rate. The timing generation circuit 28 also supplies the timing signals to the analog signal processing unit 24 so that the analog signal processing unit 24 can perform a process in synchronization with the transfer of an image signal from the image capture element unit 23.

The CPU 31 can control the timing signals generated by the timing generation circuit 28 to change the frame rate for image capture or perform electronic shutter control (intra-frame variable control of exposure time). Further, for example, the CPU 31 can apply a gain control signal to the analog signal processing unit 24 through the timing generation circuit 28 to perform variable gain control of a captured image signal.

The blur detection unit 13 is configured to detect the amount of camera shake. The blur detection unit 13 is formed of, for example, an acceleration sensor, a vibration sensor, or the like, and supplies the detected information to the CPU 31 as the amount of blur.

The flash light emitting unit 15 is driven by the light emission driving unit 14 to emit light. The CPU 31 instructs the light emission driving unit 14 to emit flash light at a predetermined time specified in a user operation or the like so that light can be emitted from the flash light emitting unit 15.

The camera DSP 4 performs various digital signal processes on the captured image signal input from the A/D conversion unit 25 of the image capture system 2.

In the camera DSP 4, for example, as shown in FIG. 1, processing functions such as an image signal processing unit 41, a compression/decompression processing unit 42, an SDRAM controller 43, and an information generation unit 44 are implemented by internal hardware or software.

The image signal processing unit 41 performs a process on the input captured image signal. For example, the image signal processing unit 41 performs arithmetic processing for controlling the driving of the image capture system 2 using the captured image signal, such as autofocus (AF) processing and auto-iris (automatic exposure (AE)) processing, and also performs processing for the input captured image signal itself, such as automatic white balance (AWB) processing.

For example, in the autofocus processing, the image signal processing unit 41 performs contrast detection of the input captured image signal, and sends the detected information to the CPU 31. Various control techniques are available as autofocus control methods. In a technique called contrast AF, contrast detection of the captured image signal is performed at each time point with the focus lens forcibly moved, and a position of the focus lens in an optimum contrast state is determined. Specifically, prior to the image capture operation, the CPU 31 performs control so as to check the contrast detection value detected by the image signal processing unit 41 while controlling the movement of the focus lens and to set a position at an optimum contrast state as an optimum focus position.

During image capture, the CPU 31 can perform focus control using a detection method called wobbling AF. During the image capture operation, the CPU 31 checks the contrast detection value detected by the image signal processing unit 41 while causing the focus lens to slightly move back and forth constantly. Although the optimum position of the focus lens may vary depending on the situation of the subject, contrast detection is performed by slightly displacing the focus lens back and forth, thereby determining changes in a focus control direction in accordance with changes of the subject. Accordingly, autofocus can be executed in accordance with subject conditions.

Note that the lens shifting mechanism in the lens driving unit 26 is assigned addresses for individual shift positions, and a lens position is identified using the addresses of the shift positions.

The lens position detection unit 27 identifies the address of the current lens position of the focus lens to calculate the distance to an in-focus subject, and supplies distance information regarding the calculated distance to the CPU 31. Therefore, the CPU 31 can determine the distance to the main subject that is in focus.

In the auto-iris processing performed by the image signal processing unit 41 of the camera DSP 4, for example, the subject brightness is calculated. For example, the average brightness of the input captured image signal is calculated and subject brightness information, or exposure information, regarding the calculated average brightness is supplied to the CPU 31. The average brightness can be calculated using various methods such as calculating an average value of brightness signals of all pixels of one frame of captured image data or calculating an average value of brightness signals when a weight is assigned to a center portion of an image.

The CPU 31 can perform automatic exposure control based on the exposure information. Specifically, exposure adjustment is performed using the aperture mechanism, the ND filter, electronic shutter control in the image capture element unit 23, or gain control for the analog signal processing unit 24.

The image signal processing unit 41 of the camera DSP 4 performs, in addition to the process for generating the signals used for the autofocus operation and auto-iris operation, signal processes on the captured image signal itself such as automatic white balance, gamma ($\gamma$) correction, edge enhancement, and camera-shake correction.

The compression/decompression processing unit 42 in the camera DSP 4 performs a compression process on the captured image signal or a decompression process on compressed image data. For example, the compression/decompression processing unit 42 performs a compression process/decompression process according to a technique such as a Joint Photographic Experts Group (JPEG) or Moving Picture Experts Group (MPEG) technique.

The SDRAM controller 43 performs writing/reading on the SDRAM 9. The SDRAM 9 is used to, for example, temporarily store the captured image signal input from the image capture system 2, store data or reserve a work area in the process performed by the image signal processing unit 41 or the compression/decompression processing unit 42, or store information obtained by the information generation unit 44. The SDRAM controller 43 performs writing/reading of such data on the SDRAM 9.

The information generation unit 44 generates information used for various operations in a combination process described below. For example, the information generation unit 44 generates distance distribution information indicating the distances to subjects in a captured image signal screen. The distance distribution information may be, for example, information regarding the distances to subjects in units of pixels as well as the distance to the main subject. The information is also called a depth map.

The determination of pixel-based distance information for generating distance distribution information can be executed by analyzing the amount of blur during the wobbling AF described above or the like. Alternatively, a light emitting unit (not shown) configured to emit auxiliary light having a specific wavelength of non-visible light may be provided and a period of time during which the light of the specific wavelength returns after it has been emitted may be measured to determine the distance to a subject on a pixel-by-pixel basis.

The control system 3 includes the CPU 31, a random access memory (RAM) 32, a flash read-only memory (ROM) 33, and a clock circuit 34. Each unit in the control system 3, each unit in the camera DSP 4, each unit in the image capture system 2, the display controller 7, the external interface 8, and the media interface 10 are configured to communicate image data or control information with one another via a system bus.

The CPU 31 controls the overall operation of the image capture apparatus 1. Specifically, the CPU 31 performs various arithmetic processes or exchanges control signals or the like with the corresponding units according to a program stored in an internal ROM or the like and according to a user operation using the operation unit 5 to cause the units to execute necessary operations. The CPU 31 also performs further processes for image combination described below such as arithmetic processing and image analysis processing.

The RAM 32 temporarily stores (or buffers) the captured image signal (image data of each frame) processed by the camera DSP 4, or temporarily stores (or buffers) combined-image data generated by a combination process described below. The RAM 32 further stores other information corresponding to various processes of the CPU 31.

The flash ROM 33 is used to store image data representing a captured image (which has been captured by a user as a still image or a moving image) or other information to be saved in a non-volatile fashion. The flash ROM 33 may also be used to store a software program for controlling the image capture apparatus 1, camera setting data, or the like.

The clock circuit 34 performs time counting to determine current time information (year, month, day, hour, minute, and second).

The operation unit 5 includes the operators shown in FIGS. 2A and 2B and a signal generation unit for generating signals according to the operations of the operators. User operation information based on the operators is sent from the operation unit 5 to the CPU 31.

The operation unit 5 may be configured to allow touch panel operations as well as operations using the operators. Specifically, the display panel 6 may be provided with a touch sensor so that an operation input can be performed in response to a touch of the screen by the user.

The display controller 7 causes the display panel 6 to execute a necessary display operation under the control of the CPU 31. Examples of display operations on the display panel 6 include display of a monitor (so-called Live View Display during image capture, display of a playback image read from the recording medium 90 or the flash ROM 33, display of an operation menu, display of various icons, and display of time and date.

The media interface 10 performs reading/writing of data on the recording medium 90, such as a memory card (a card-shaped removable memory) placed in the image capture apparatus 1, under the control of the CPU 31. For example, the media interface 10 performs an operation of recording still-image data or moving-image data obtained as a result of image capture onto the recording medium 90.

The media interface 10 further performs an operation of reading recorded still-image data or moving-image data from the recording medium 90.

While the recording medium 90 is implemented as a portable memory card by way of example, the recording medium 90 may be any other recording medium for recording image data of a still image or a moving image to be saved as a result of image capture. For example, a portable disk medium such as an optical disk may be used, or a hard disk drive (HDD) may be incorporated and used for recording.

The external interface 8 sends and receives various data to and from an external device via a predetermined cable according to a signal standard such as the universal serial bus (USB) standard. The external interface 8 may be an external interface complying with a standard other than the USB standard, such as the Institute of Electrical and Electronics Engineers (IEEE) 1394 standard.

In place of a wired transmission interface, the external interface 8 may be a wireless transmission interface such as an infrared transmission interface or a near field communication interface.

The image capture apparatus 1 is configured to send and receive data to and from a personal computer or other various devices via the external interface 8. For example, the image capture apparatus 1 can transfer captured image data to an external device.

In the image capture apparatus 1 of the present embodiment, the CPU 31 executes image capture operation control or arithmetic processing and control for various operations according to a program stored therein and a user operation from the operation unit 5. The CPU 31 performs arithmetic processing and control operations including the following processes.

The CPU 31 performs image capture control. Specifically, the CPU 31 controls each unit in the image capture system 2 or the camera DSP 4 to capture a subject image. The CPU 31 performs other processes such as an autofocus process, an automatic exposure adjustment process, and a flash light emission control process. During image capture, a user can select any of various image capture modes described below, and the CPU 31 controls the operation of the image capture system 2 according to the selected image capture mode.

The CPU 31 further performs an image combination process. In the image capture operation, each frame of image data captured by the image capture system 2 and processed by the camera DSP 4 is transferred and buffered into the RAM 32. In particular, in the image capture mode called "live image combination" described below, a plurality of frames of image data buffered are combined to generate combined-image data used to represent a special effect such as the long-time exposure effect.

For example, the CPU 31 may perform a combination process using weighted averages on a predetermined frames of image data from the most recent frame of image data among frames of image data having continuity in time, which have been captured and sequentially buffered every frame period, to generate combined-image data.

A plurality of frames of image data may be combined by assigning an equal weighting coefficient to each frame of image data or assigning a high weighting coefficient to a specific frame of image data to obtain a desired image effect.

The CPU 31 further performs display control. Specifically, the CPU 31 instructs the display controller 7 to cause the display panel 6 to execute desired display by applying data for display. For example, monitor display during image capture or display of a playback image may be executed. In particular, the combined-image data generated by the combination process described above is supplied to the display controller 7 as each frame of data used for image capture monitoring, thereby displaying a monitor moving image (live view movie) with a special image effect.

The CPU 31 further performs recording, playback, and transmission control. Specifically, the CPU 31 instructs the media interface 10 to control reading from the recording medium 90 or writing into the recording medium 90. For example, in accordance with a user's shutter operation, the CPU 31 instructs the media interface 10 to record a certain frame of image data that has been buffered or combined-image data onto the recording medium 90 as still-image data to be saved. Further, the CPU 31 can also instruct the media interface 10 to record each frame of captured image data to be buffered or combined-image data onto the recording medium 90 as moving-image data.

The CPU 31 further performs a process of sending captured image data, combined-image data, image data read from the recording medium 90, or the like to an external device through the external interface 8.

The CPU 31 further performs an operation detection process to detect operation input information given by a user. Specifically, input information from the operation unit 5 is detected. Based on the operation input information detected in this operation detection process, the CPU 31 executes image capture operation control, combination processing during image capture, image data recording/playback/transmission control, or the like.

2. Exemplary Operation in Live-Image Combination Mode

An exemplary operation in a live-image combination mode, which may be a feature of the image capture apparatus 1 of the present embodiment will now be described.

A user can select various preset image capture mode when he or she performs image capture using the image capture apparatus 1.

Examples of the image capture modes include an auto mode, a portrait mode, a landscape mode, a macro mode, a sports mode, a sunset scene mode, a night scene mode, and a moving image capture mode.

The auto mode is an image capture mode in which the optimum settings such as the aperture value, shutter speed, and International Organization for Standardization (ISO) sensitivity are automatically performed using the image capture apparatus 1.

The portrait mode is an image capture mode in which image capture is performed with settings optimal for providing shots of people.

The landscape mode is an image capture mode in which image capture is performed with settings optimal for providing shots of landscapes.

The macro mode is an image capture mode in which image capture is performed with settings optimal for providing shots of subjects closer to the camera than normal. A special macro mode, namely, a nature macro mode for providing sharp and vivid macro shots of flowers and insects, may be provided.

The sports mode is an image capture mode in which image capture is performed with settings optimal for providing shots of actions.

The sunset scene mode is an image capture mode in which image capture is performed with settings optimal for providing shots of sunset scenes.

The night scene mode is an image capture mode in which image capture is performed with settings optimal for providing shots of night scenes.

The moving image capture mode is an image capture mode in which a moving image is captured.

Other modes, such as a night portrait mode suitable for providing shots of people in night scenes and a firework mode suitable for providing shots of fireworks, may be provided.

The user selects a desired image capture mode from among the image capture modes described above, thereby performing an image capture operation to obtain a captured image suitable for the subject type or condition.

In the present exemplary operation, a "live image combination" mode is preset as an image capture mode.

Figure 3:
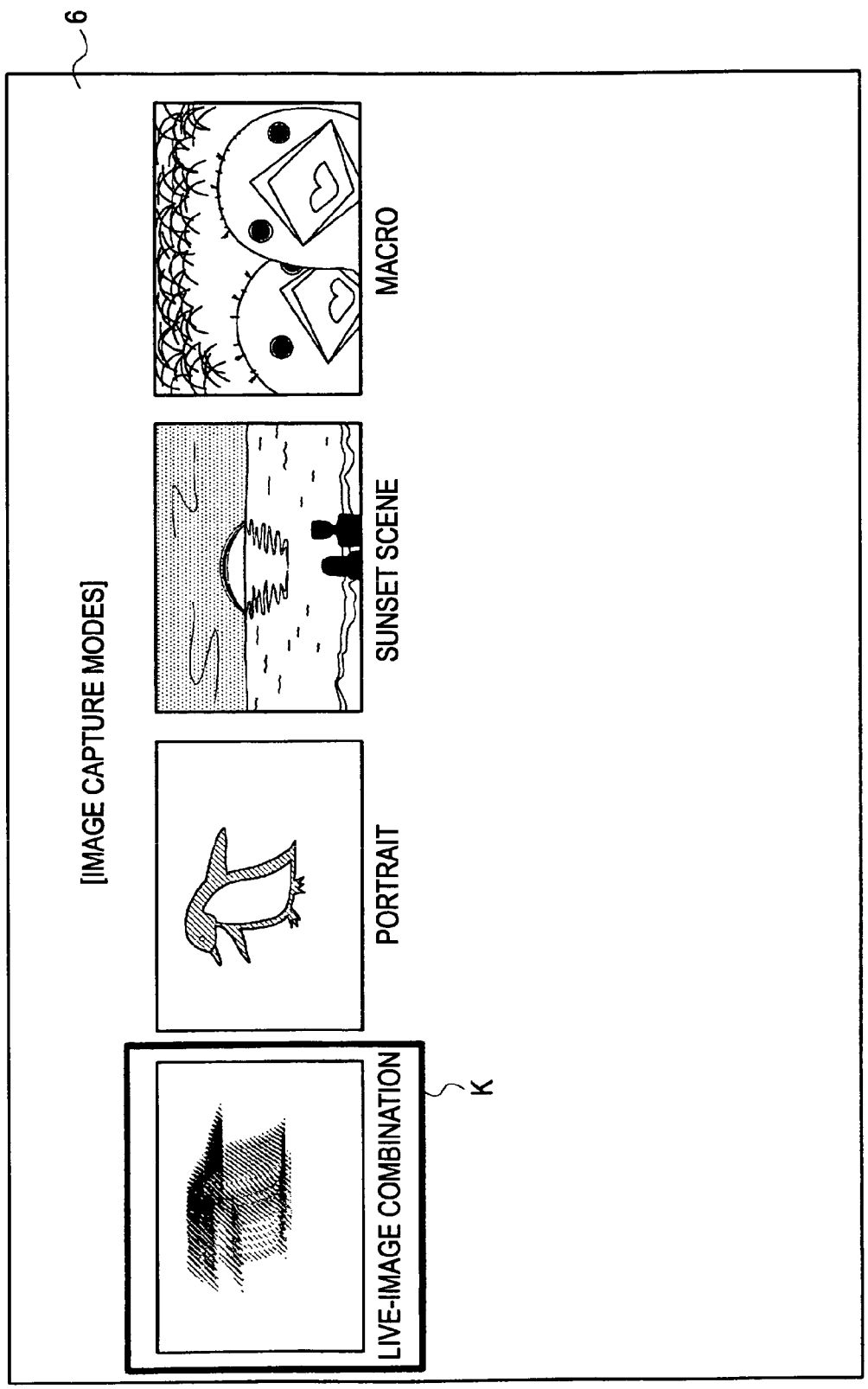
FIG. 3 is a diagram showing an image capture mode selection screen according to the embodiment.

The CPU 31 allows the user to select an image capture mode using a mode selection screen as shown in FIG. 3 which is displayed on the display panel 6.

In this case, in addition to the standard image capture modes such as "auto mode" image capture, "portrait mode" image capture, "sunset scene mode" image capture, and "macro mode" image capture, the live-image combination mode is displayed together with an image associated therewith. The image associated with the live-image combination mode may be, for example, an image of the long-time exposure effect. The user can select a desired mode according to the image capture purpose by moving a cursor K. The display of the images associated with the respective modes helps inexperienced users select a mode. In particular, users who are not familiar with the implementation of special effects such as the long-time exposure effect can be navigated through the details of the live-image combination mode using the image associated with the live-image combination mode.

The operation of selecting a mode may be performed using, for example, the dial operation unit 5h shown in FIG. 2B.

When the user selects an image capture mode, the CPU 31 performs operation settings according to the selected image capture mode. For example, the CPU 31 controls each unit in the image capture system 2 to determine settings such as the exposure amount, the exposure method, the electronic shutter setting, the frame rate, and the gain.

An exemplary operation in response to a selection of the live-image combination mode by a user will now be described in detail.

Figure 4:
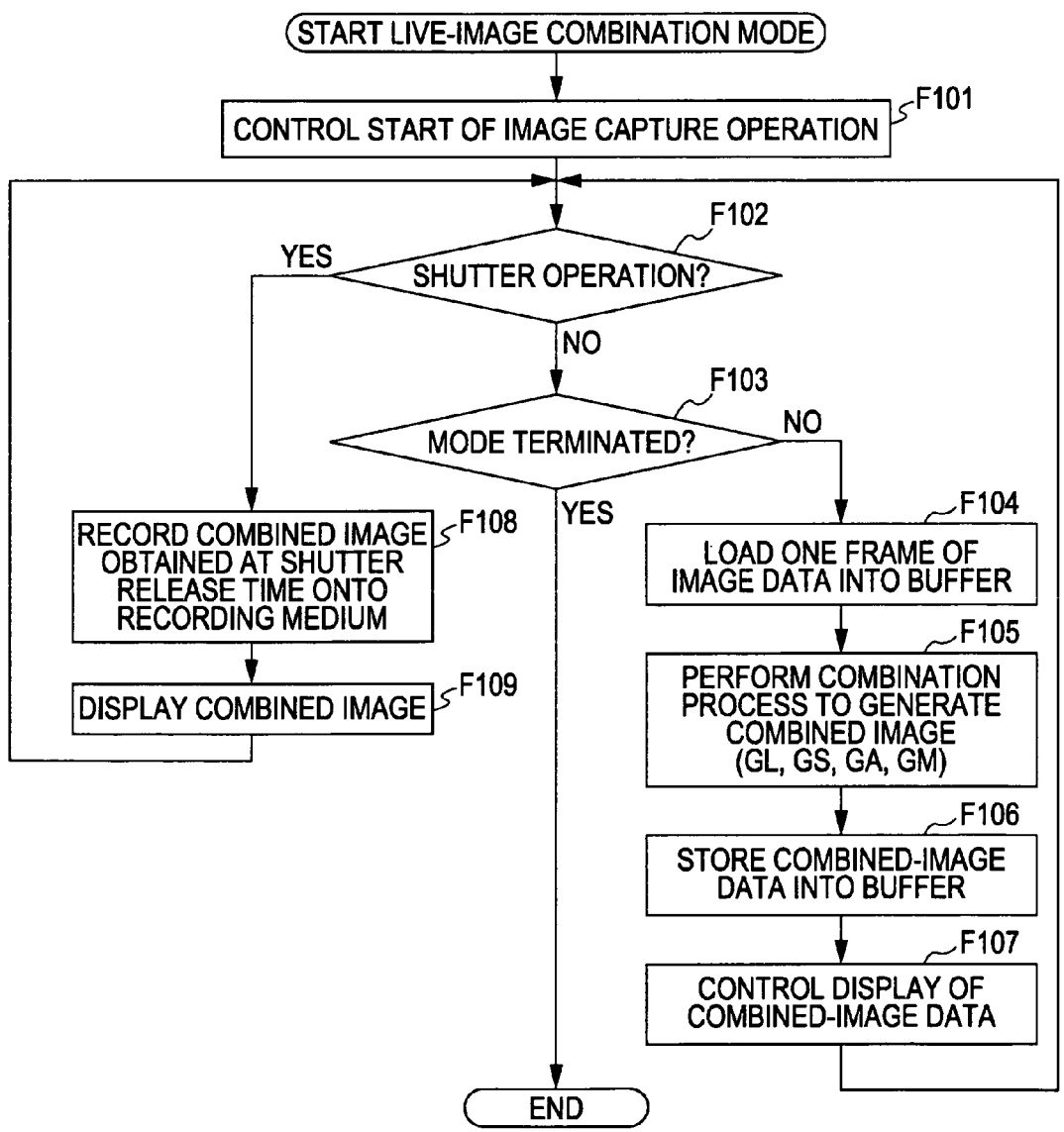
FIG. 4 is a flowchart showing a live-image combination mode process according to the embodiment.

When a user performs the operation of selecting the live-image combination mode, the CPU 31 starts a process shown in FIG. 4. First, in step F101, the CPU 31 controls the start of the capture image operation. The CPU 31 causes each unit of the image capture system 2 and the camera DSP4 to start the image capture operation. Accordingly, frame-by-frame acquisition of image data for a subject image is started.

In step F102, the CPU 31 monitors a user's shutter operation. In step F103, the CPU 31 monitors a terminating operation of the live-image combination mode. If none of those operations occurs, the CPU 31 proceeds to step F104.

In step F104, one frame of image data captured by the image capture system 2 and processed by the camera DSP 4 is loaded into the RAM 32.

Figure 5A:
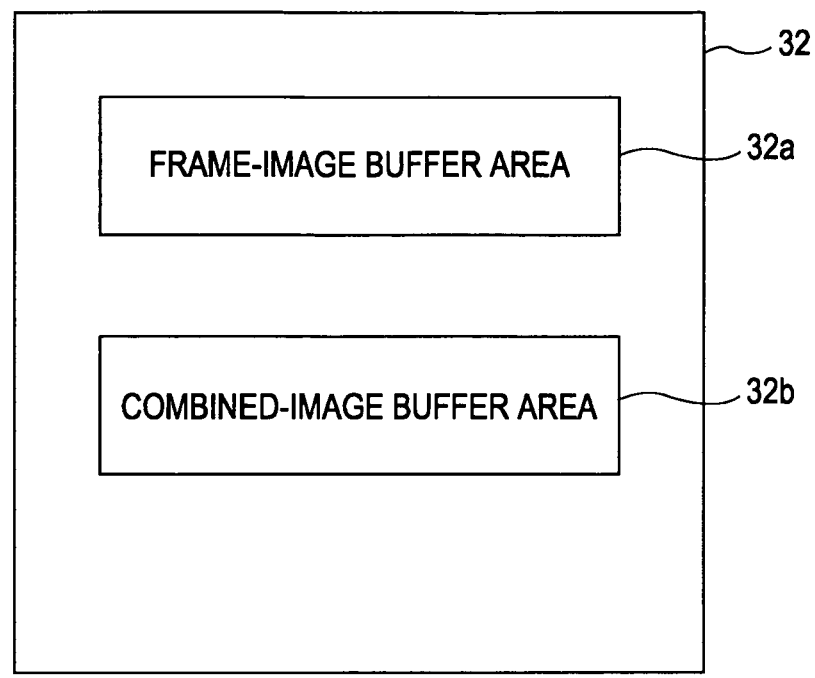
FIGS. 5A and 5B are diagrams showing a buffer area according to the embodiment.

As shown in FIG. 5A, the RAM 32 has a frame-image buffer area 32a and a combined-image buffer area 32b.

The frame-image buffer area 32a is an area for buffering the respective frames of image data transferred every frame period from the camera DSP 4 after the image capture operation has been started in step F101. In step F104, one frame of image data transferred from the camera DSP 4 is temporarily stored in the frame-image buffer area 32a.

Then, the CPU 31 performs a combination process in step F105, buffering of combined-image data in step F106, and display control of the combined-image data in step F107. Then, the CPU 31 performs the processing of steps F104 to F107 again through steps F102 and F103.

That is, for a period before the shutter operation has been performed, the CPU 31 performs the processing of steps F104 to F107 every frame period. The current frame of image data and a predetermined number of preceding frames of image data are buffered into the frame-image buffer area 32a of the RAM 32 in accordance with the capacity of the frame-image buffer area 32a. When the frame-image buffer area 32a becomes full with the progress of the operation, a new frame of image data may be stored while the oldest frame of buffered image data is deleted.

The processing of steps F105 to F107 is performed as follows by way of example.

First, in step F105, a combination process is performed using the most recent frame of image data (the frame of image data loaded in step F104) and a predetermined number of preceding frames of image data among the frames of image data temporarily stored in the frame-image buffer area 32a at the current time.

FIG. 6 shows an image obtained in the combination process.

Frames of image data loaded into the frame-image buffer area 32a are represented by image data #1, #2, #3, and so forth. It is assumed that an image data range used for the combination process is a range of seven frames including the most recent frame. The number of frames used for the combination process may be, but not limited to, seven.

It is now assumed that, in step F104, the image data #7 is loaded as a captured image frame obtained at time t7. In this case, in the combination process in step F105, a combination range A1 including seven frames of image data including the most recent image data #7 (i.e., #1 to #7) is used.

Then, the respective frames of image data (#1 to #7) in the combination range A1 are used and the setting of weighting coefficients or a weighted average process is performed to generate combined-image data.

Here, four types of combined-image data (GL, GS, GA, and GM) are generated. FIG. 6 shows combined-image data GL1, GS1, GA1, and GM1.

The combined-image data GL may be combined-image data for achieving the long-time exposure effect. The long-time exposure effect is an effect represented by, as illustratively shown as a combined image shown in FIG. 7, for example, performing continuous exposure for a long time on a moving image.

For example, in order to generate the combined-image data GL1 with the long-time exposure effect from the frames of image data #1 to #7, the frames of image data #1 to #7 are equally weighted and combined. FIG. 7 schematically shows weighting coefficients w1 to w7 to be assigned to the frames of image data #1 to #7, respectively. Each of the weighting coefficients w1 to w7 has a height representing a weighting coefficient value. In this manner, the respective frames of image data #1 to #7 are equally weighted and are subjected to weighted average processing to generate a combined image. Specifically, the values of corresponding pixels in the respective frames of image data #1 to #7 are added and the resulting sum is divided by the number of frames of image data (in this case, seven). Therefore, a combined image with the long-time exposure effect as shown in FIG. 7 is obtained.

For example, if the series of frames of image data #1 to #7 represents an image in which a subject is moving from right to left, combined-image data of an image similar to that obtained by performing long-time exposure on a subject that is moving from right to left is generated as a combined image as shown in FIG. 7.

The combined-image data GS may be combined-image data for achieving the first-curtain synchronization effect. The first-curtain synchronization effect is an image capture technique in which a clear representation of the temporally first state is provided by firing a flash only at the beginning of long-time exposure.

Figure 8:
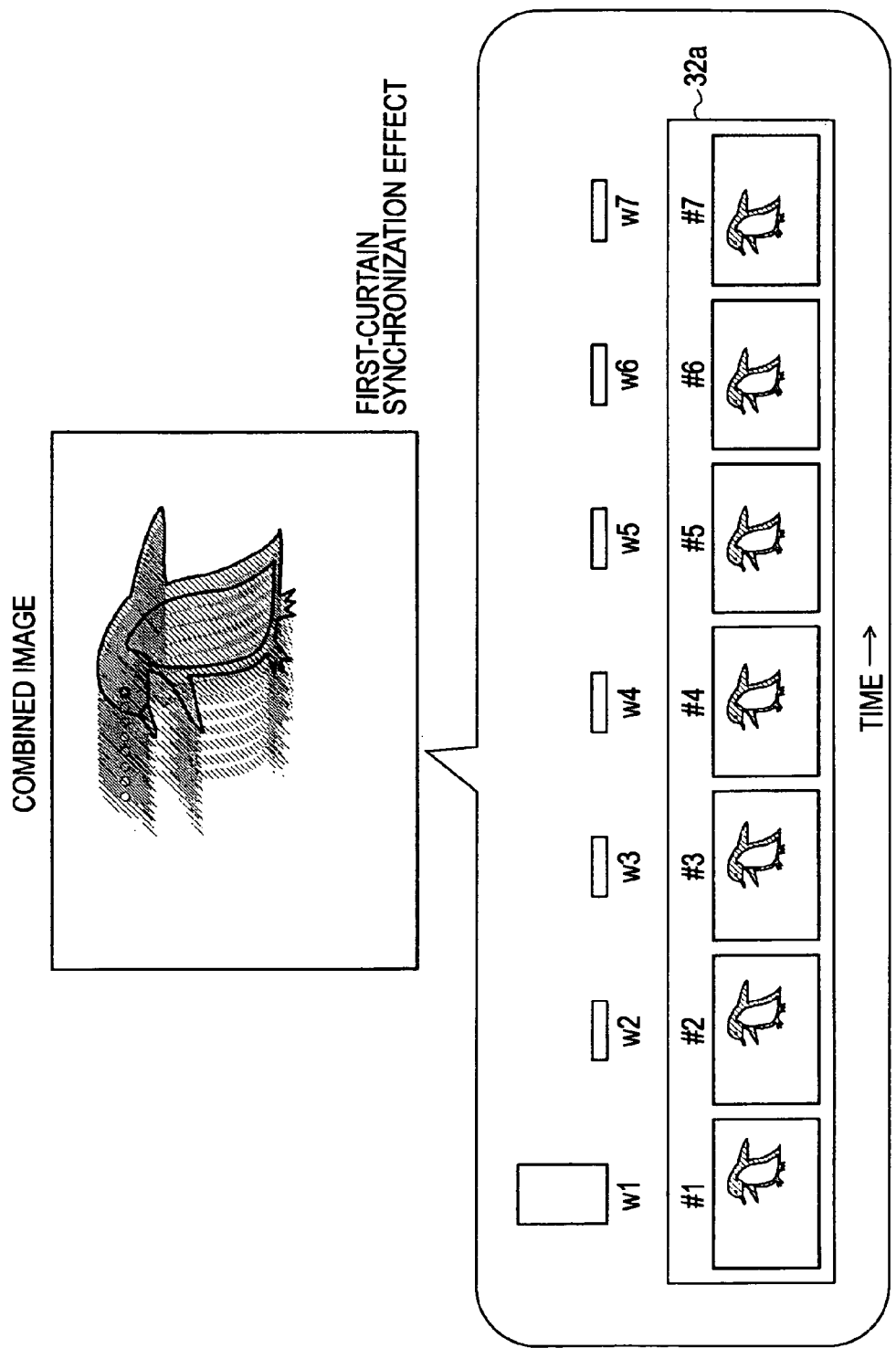
FIG. 8 is a diagram describing a combination process with the first-curtain synchronization effect according to the embodiment.

FIG. 8 shows an example of a combined image with the first-curtain synchronization effect.

In this example, such a first-curtain synchronization effect is obtained by combining consecutive frames of image data in a combination range so that a high weighting coefficient is assigned to the first frame of image data and a low weighting coefficient is assigned to the subsequent remaining frames of image data.

Specifically, in the frames of image data #1 to #7, a high weighting coefficient w1 is assigned to the frame of image data #1 while low weighting coefficients w2 to w7 are assigned to the remaining frames of image data #2 to #7. Then, weighted average processing is performed to generate the combined-image data GS1. Thus, a combined image with the first-curtain synchronization effect as shown in FIG. 8 is obtained.

The combined-image data GA may be combined-image data for achieving the second-curtain synchronization effect. The second-curtain synchronization effect is an image capture technique in which a clear representation of the temporally last state is provided by firing a flash only at the end of long-time exposure.

FIG. 9 shows an example of a combined image with the second-curtain synchronization effect.

In this example, such a second-curtain synchronization effect is obtained by combining consecutive frames of image data in a combination range so that a high weighting coefficient is assigned to the last frame of image data and a low weighting coefficient is assigned to the remaining frames of image data.

Specifically, in the frames of image data #1 to #7, a high weighting coefficient w7 is assigned to the frame of image data #7 while low weighting coefficients w1 to w6 are assigned to the remaining frames of image data #1 to #6. Then, weighted average processing is performed to generate the combined-image data GA1. Thus, a combined image with the second-curtain synchronization effect as shown in FIG. 9 is obtained.

The combined-image data GM may be combined-image data for achieving the multi-flash effect. The multi-flash effect is an image capture technique in which a clear representation of the state of a subject is provided by periodically firing a flash during long-time exposure.

FIG. 10 shows an example of a combined image with the multi-flash effect.

In this example, such a multi-flash effect is obtained by periodically assigning high and low weighting coefficients to consecutive frames of image data in a combination range and combining the consecutive frames of image data.

For example, in the frames of image data #1 to #7, high weighting coefficients w1, w4, and w7 are assigned to the frames of image data #1, #4, and #7 while low weighting coefficients w2, w3, w5, and w6 are assigned to the remaining frames of image data #2, #3, #5, and #6. Then, weighted average processing is performed to generate the combined-image data GM1. Thus, a combined image with the multi-flash effect as shown in FIG. 10 is obtained.

When the frame of image data #7 is loaded at time t7 shown in FIG. 6, in step F105, the CPU 31 generates the combined-image data GL1, GS1, GA1, and GM1 using the buffered frames of image data #1 to #7.

Then, in step F106, the CPU 31 temporarily stores the combined-image data GL1, GS1, GA1, and GM1 into the combined-image buffer area 32b of the RAM 32.

Then, in step F107, the CPU 31 outputs the combined-image data GL1, GS1, GA1, and GM1 to the display controller 7 as display data, and causes the display panel 6 to execute predetermined monitor display. An example of the display will be described below.

Next, at time t8 shown in FIG. 6, the next frame of image data #8 is loaded into the RAM 32 (step F104). Also in this case, the CPU 31 performs a similar combination process in step F105. In this case, as indicated as a combination range A2 shown in FIG. 6, seven frames of image data (#2 to #8) including the most recent frame of image data #8 are used to perform a combination process to generate four types of combined-image data GL2, GS2, GA2, and GM2.

Then, in step F106, the CPU 31 temporarily stores the combined-image data GL2, GS2, GA2, and GM2 into the combined-image buffer area 32b of the RAM 32.

Then, in step F107, the CPU 31 outputs the combined-image data GL2, GS2, GA2, and GM2 to the display controller 7 as display data, and causes the display panel 6 to execute predetermined monitor display.

Further, at time t9 shown in FIG. 6, the next frame of image data #9 is loaded into the RAM 32 (step F104). Also in this case, the CPU 31 performs a similar combination process in step F105. In this case, as indicated as a combination range A3 shown in FIG. 6, seven frames of image data (#3 to #9) including the most recent frame of image data #9 are used to perform a combination process to generate four types of combined-image data GL3, GS3, GA3, and GM3.

Then, in step F106, the CPU 31 temporarily stores the combined-image data GL3, GS3, GA3, and GM3 into the combined-image buffer area 32b of the RAM 32.

Then, in step F107, the CPU 31 outputs the combined-image data GL3, GS3, GA3, and GM3 to the display controller 7 as display data, and causes the display panel 6 to execute predetermined monitor display.

The process described above is continued until a shutter operation has been performed or until the operation of terminating the live-image combination mode (the operation of switching to another mode) has been performed.

Figure 5B:
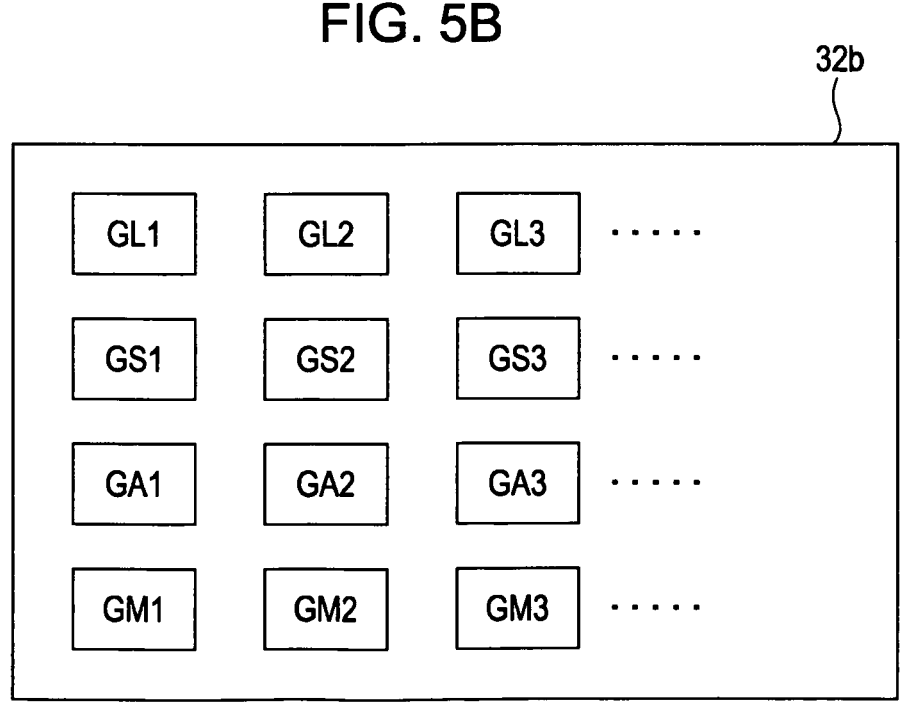

FIG. 5B schematically shows the respective types of combined-image data described above, which are temporarily stored into the combined-image buffer area 32b of the RAM 32 in step F106. When the combined-image buffer area 32b becomes full as a result of repeating the process described above, new combined-image data may be temporarily stored while the oldest combined-image data is deleted.

The processing of steps F104 to F107 is repeated for a period of time during which the user is looking for a shooting opportunity. In other words, the user is waiting for a good shooting opportunity while viewing the display panel 6.

According to the processing of step F107, four types of combined-image data (GL, GS, GA, and GM) are supplied to the display controller 7 as data used for display. The display controller 7 causes the display panel 6 to perform display shown in, for example, FIG. 11 using the combined-image data (GL, GS, GA, and GM).

Among the displayed images, an image displayed in a selection image are 61 is displayed in the largest size.

Further, images corresponding to the four types of combined-image data (GL, GS, GA, and GM) are displayed side-by-side. Specifically, a long-time exposure effect image 62 based on the combined-image data GL, a first-curtain synchronization effect image 63 based on the combined-image data GS, a second-curtain synchronization effect image 64 based on the combined-image data GA, and a multi-flash effect image 65 based on the combined-image data GM are displayed.

Further, a combination setting indication 66 is displayed. The combination setting indication 66 may be, for example, a combination time indication. For example, "combination time: 2 sec" shown in FIG. 11 indicates that the combination process described above is performed on the most recent frame and preceding frames corresponding to the past two seconds. For example, if images are captured at a frame rate of 30 frames per second, a combination process of 60 frames is performed.

The user can select a desired image from among the images 62, 63, 64, and 65 of the four types of image effects by operating a cursor K. Although not shown in the process shown in FIG. 4, the CPU 31 sends the display position of the cursor K to the display controller 7 in accordance with a user's cursor operation so that an object selected using the cursor K can be represented on the display panel 6.

Further, an enlarged view of an image currently being selected using the cursor K may be displayed in the selection image are 61 on the screen.

Figure 11:
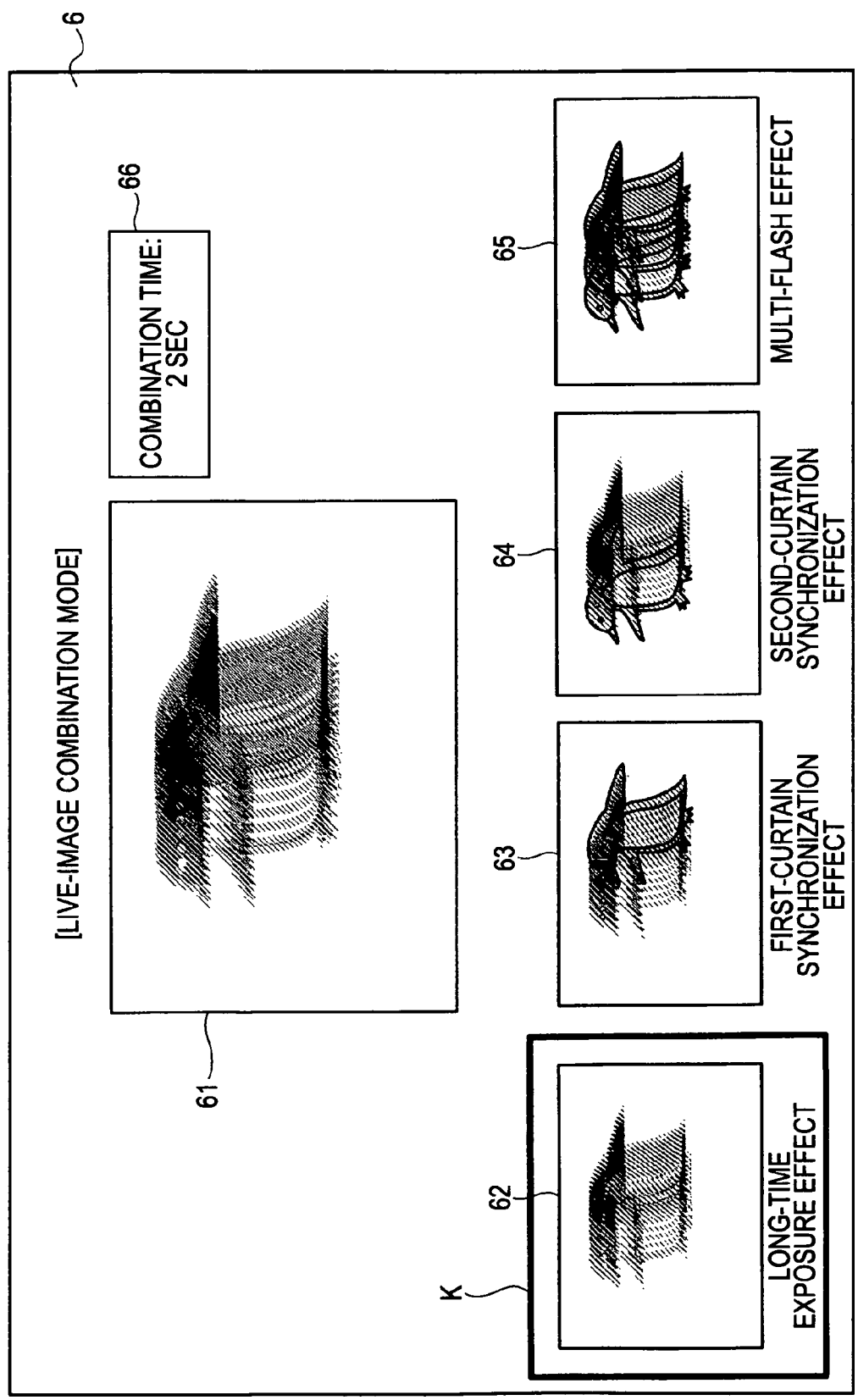
FIG. 11 is a diagram showing an image that is displayed in a live-image combination mode according to the embodiment.

For example, in FIG. 11, the long-time exposure effect image 62 is currently being selected using the cursor K. In this case, a combined image to which the long-time exposure effect is applied is displayed in the selection image area 61.

Figure 12:
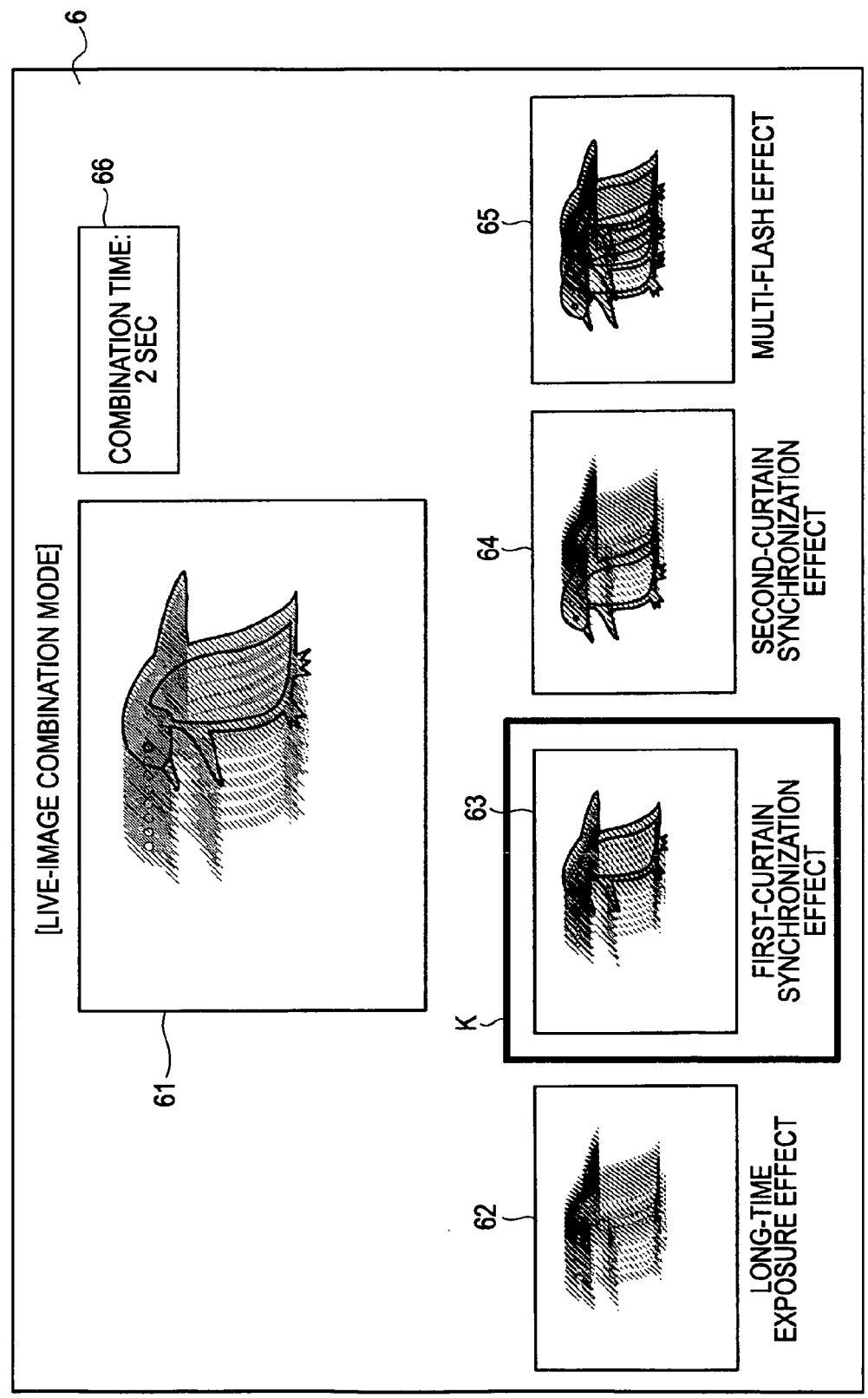
FIG. 12 is a diagram showing an image that is displayed in the live-image combination mode according to the embodiment.

In FIG. 12, the first-curtain synchronization effect image 63 is currently being selected using the cursor K. In this case, a combined image to which the first-curtain synchronization effect is applied is displayed in the selection image area 61.

Figure 13:
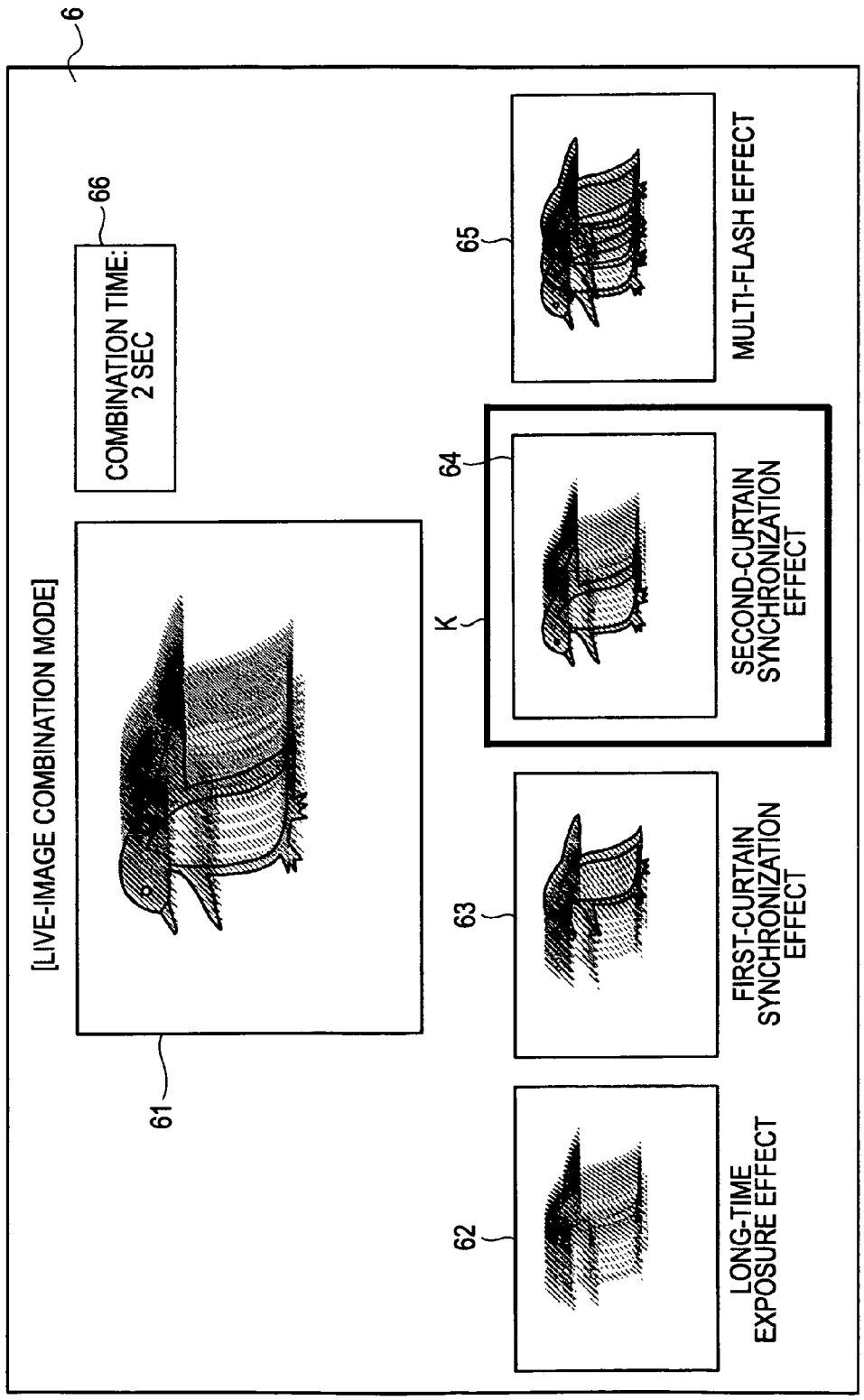
FIG. 13 is a diagram showing an image that is displayed in the live-image combination mode according to the embodiment.

In FIG. 13, the second-curtain synchronization effect image 64 is currently being selected using the cursor K. In this case, a combined image to which the second-curtain synchronization effect is applied is displayed in the selection image area 61.

Figure 14:
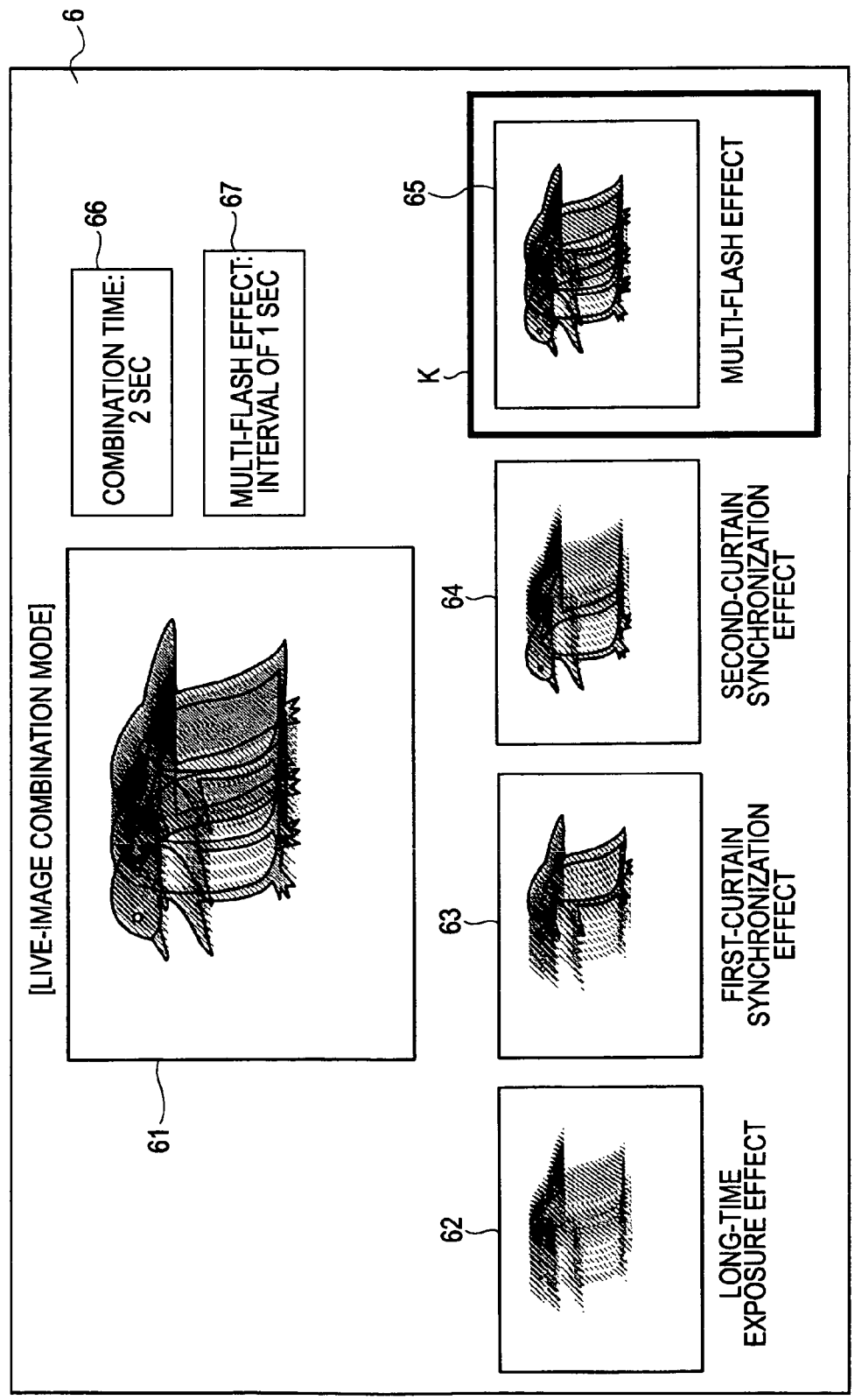
FIG. 14 is a diagram showing an image that is displayed in the live-image combination mode according to the embodiment.

In FIG. 14, the multi-flash effect image 65 is currently being selected using the cursor K. In this case, a combined image to which the multi-flash effect is applied is displayed in the selection image area 61.

As described above, in the processing of step F107, the four types of combined-image data GL, GS, GA, and GM are output every frame period to the display controller 7 as display data.

Specifically, the combined-image data GL1, GL2, GL3, etc., are used in every frame period to display the long-time exposure effect image 62.

The combined-image data GS1, GS2, GS3, etc., are used in every frame period to display the first-curtain synchronization effect image 63.

The combined-image data GA1, GA2, GA3, etc., are used in every frame period to display the second-curtain synchronization effect image 64.

The combined-image data GM1, GM2, GM3, etc., are used in every frame period to display the multi-flash effect image 65.

On the display panel 6, therefore, real-time moving images (moving images showing subject scenes as through images (live views)) serving as monitor screen images of the current subject are displayed as an image to which the long-time exposure effect is applied, an image to which the first-curtain synchronization effect is applied, an image to which the second-curtain synchronization effect is applied, and an image to which the multi-flash effect is applied.

One of the images with such effects is selected by the user and is displayed in the selection image area 61.

Thus, the user can actually view images that will be obtained as a result of applying the above image effects while waiting for a good shooting opportunity. In other words, the user can look for a shooting opportunity while viewing a result of actually applying a special effect.

As shown in FIG. 14, when the multi-flash effect image 65 is selected and displayed in the selection image area 61, a light emission interval indication 67 may be provided.

Figure 15:
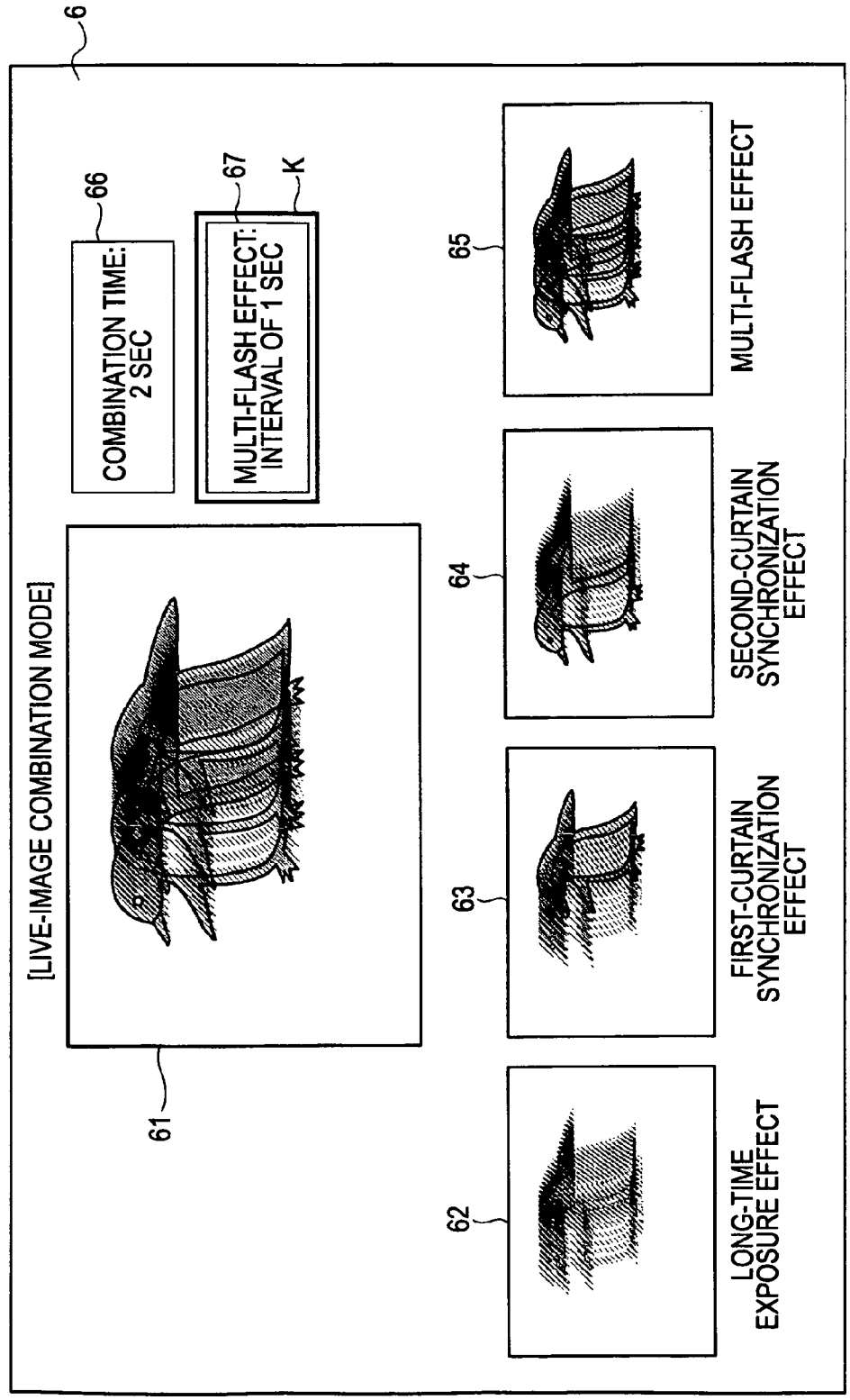
FIG. 15 is a diagram showing an image that is displayed in the live-image combination mode according to the embodiment.

The multi-flash effect is an image effect obtained by periodically emitting flash light, and the visual impression of images differs depending on the light emission interval. Thus, desirably, the user can modify the light emission interval, for instance, in the present exemplary operation, the intervals of frames to which a high weighting coefficient shown in FIG. 10 is assigned in the combination process, as desired. As shown in FIG. 15, the user may be allowed to select the light emission interval indication 67 using the cursor K and perform a predetermined operation to modify the light emission interval. For example, the user may be allowed to change the light emission interval to 0.5 seconds, 0.75 seconds, 1 second, 1.25 seconds, 1.5 seconds, 2 seconds, or the like. The setting may also be changed with smaller time steps.

When the light emission interval is changed, the CPU 31 changes the interval at which a high weighting coefficient is assigned when the combined-image data GM is generated in the combination process in step F105 shown in FIG. 4. Thus, the multi-flash effect of the multi-flash effect image 65 (when it is currently being selected, an image displayed in the selection image area 61) can be adjusted on the display, and can be viewed by the user.

The user is also desirably allowed to modify the combination setting indication 66 by performing a predetermined operation using the cursor K. For example, the user may be allowed to change the combination time to 0.5 seconds, 1 second, 1.5 seconds, 2 seconds, 2.5 seconds, 3 seconds, or the like. The setting may also be changed with smaller time steps.

When the combination time is changed, the CPU 31 may change the combination range (the number of frames) used in the combination process in step F105 shown in FIG. 4 in accordance with the changed combination time.

As described above, the user performs a shutter operation at a desired timing while viewing a monitor image of a subject scene to which the long-time exposure effect or the like is applied in real time, which is displayed on the display panel 6.

When a user's shutter operation is detected, the CPU 31 advances the process from step F102 to step F108 and performs a process of recording a combined image obtained at the time of shutter release onto the recording medium 90. The combined image obtained at the time of shutter release may include the combined-image data GL, GS, GA, and GM that have been generated in step F105 immediately before the detection of the shutter operation and that have been temporarily stored in step F106.

Then, for example, the combined image currently being selected by the user, that is, the combined image displayed in the selection image area 61 on the display panel 6, is used as combined-image data to be actually saved as a still image. For example, as shown in FIG. 11, when a combined image of the long-time exposure effect is currently being selected, the CPU 31 transfers this combined image GL(x) of the long-time exposure effect to the media interface 10 to store the combined image GL(x) onto the recording medium 90.

Thus, the user can save a combined image of the long-time exposure effect for a desired scene as one photograph (still image).

In step F109, the CPU 31 controls the display controller 7 to display the combined-image data recorded onto the recording medium 90 on the display panel 6 so that the user can view the captured image. The recorded combined image may be displayed in full screen for, for example, about two seconds to about five seconds.

Then, when the display is completed, the processing of steps F102 to F107 resumes.

Therefore, the image of the long-time exposure effect or the like is displayed as a real-time monitor image again so that the user can look for a next shooting opportunity.

When a user's operation of terminating the live-image combination mode is detected in step F103, the CPU 31 ends the process shown in FIG. 4.

The process of recording the captured image in step F108 may also be performed as follows by way of example.

For example, not only the combined image currently being displayed in the selection image area 61 but also all the four types of combined images may be recorded onto the recording medium 90. In other words, still-image data of four pictures of the long-time exposure effect, first-curtain synchronization effect, second-curtain synchronization effect, and multi-flash effect may be recorded onto the recording medium 90 by a single shutter operation.

While the combined image obtained at the time of shutter release is implemented by the combined-image data that has been generated in step F105 immediately before the time of shutter release, frames including a frame obtained immediately after the shutter operation is detected in step F102 may be used to generate combined-image data GL, GS, GA, and GM, and the combined-image data GL, GS, GA, and GM may be recorded onto the recording medium 90 as combined-image data obtained at the time of shutter release.

In this case, only the combined image currently being selected may be generated and recorded. For example, as shown in FIG. 14, if the shutter operation is detected when a long-time exposure effect image is being selected, in step F108, combined-image data GL of the long-time exposure effect may be generated using a frame obtained immediately after the shutter operation as the most recent frame, and may be recorded onto the recording medium 90.

Further, in addition to the combined image obtained at the time of shutter release, combined-image data obtained within a certain time range may be recorded onto the recording medium 90. As shown in FIG. 5B, the combined-image data GL, GS, GA, and GM generated in every frame period are temporarily saved in the combined-image buffer area 32b.

Thus, combined-image data that has been obtained some time before the time of shutter release may also be recorded onto the recording medium 90 as captured images. For example, several frames of combined-image data that have been obtained before the time of shutter release may be collectively recorded.

Further, in addition to combined-image data, the image data buffered in the frame-image buffer area 32a, for instance, a plurality of frames of image data from which combined-image data to be recorded is generated, may also be recorded onto the recording medium 90.

In the present exemplary operation, image data obtained as a result of image capture is saved in the recording medium 90. The image data may be saved in the flash ROM 33 instead of the recording medium 90. Another operation method in which the image data is normally recorded onto the recording medium 90 and is recorded onto the flash ROM 33 when the recording medium 90 is not placed may be used.

With the present exemplary operation described above, the image capture apparatus 1 can be configured such that combined images with applied effects such as the long-time exposure, first-curtain synchronization, second-curtain synchronization, or multi-flash are generated and displayed, thereby presenting image effects that will be achieved by performing image combination to a user before the user performs image capture (or performs a shutter operation) so that the user can aim at an image effect to perform the image capture operation.

In addition, an image of a subject scene to which each of the effects described above is applied in real time is displayed, thus facilitating recognition of optimum shutter release time for achieving the long-time exposure, first-curtain synchronization, second-curtain synchronization, and multi-flash effects. Therefore, even inexperienced users can appropriately capture various special images.

Additionally, four types of image effects can be viewed at the same time. This helps a user more accurately select a desired effect according to the user's preference or the subject scene.

Further, as described above, combined-image data is also buffered in the combined-image buffer area 32b. This allows recording of, in accordance with a shutter operation, both a displayed image obtained at the time of shutter release and combined images obtained before and after the time of shutter release. Therefore, a camera designed to more prevent a user from missing a good shutter release opportunity to obtain a special photographic effect image can be provided.

In the example described above, four types of combined-image data are generated in every frame period in step F105. Alternatively, combined images to which one, two, three, or more than four image effects are applied may be generated.

Further, the processing of steps F105 to F107 may not necessarily be performed every frame period. For example, the processing of steps F105 to F107 may be performed intermittently such as once a two-frame period or once a three-frame period. In particular, in a case where it is difficult to speed up the time involved in the combination process, the processing of steps F105 to F107 is preferably performed intermittently.

For instance, in the example shown in FIG. 6, the combination process is performed using the combination range A1, and then the combination process may be performed using the combination range A3.

In a case where the time involved in the combination process is long, image data corresponding to a time longer than the time involved in the combination process may be accumulated in the frame-image buffer area 32a.

Furthermore, in order to reduce the processing load on the CPU 31 for the combination process and the combined-image data display process, the processing of step F105 to F107 may be implemented by generating and displaying low-resolution combined-image data.

Alternatively, each of the long-time exposure effect image 62, first-curtain synchronization effect image 63, second-curtain synchronization effect image 64, and multi-flash effect image 65 displayed on the display panel 6 may be a preset image (still image or moving image) representing the corresponding image effect, and an actual monitor image of a subject scene may be displayed only in the selection image area 61. In this case, only one type of combined-image data currently being selected using the cursor K may be processed as data for display.

While the display shown in FIG. 14 or the like described above is produced on the display panel 6, for example, display image data may be transferred from the external interface 8 to an external display device and the images shown in FIG. 14 or the like may be displayed on the display device.

The present exemplary operation can also be applied when the image capture apparatus 1 is implemented by a digital single-lens reflex (SLR) camera. As is common in the art, in SLR cameras, subject light is directed to a viewfinder in the so-called "mirror down" state of an imaging optical system, and, when a shutter operation is performed, a "mirror up" state is introduced and the subject light is directed to an imaging device unit so that the imaging device unit is exposed to the light. Here, when the live-image combination mode described above is selected, the mirror down state is set so that the subject light can be directed to the imaging element unit unless a shutter operation is performed. Then, a combination process is performed on image data obtained by the imaging element unit and a combined image is displayed. Therefore, an operation similar to that described above is implemented. The following exemplary operations can also be applied to a digital SLR camera.

3. Other Exemplary Operation of Live-Image Combination Mode

Next, another exemplary operation in the live-image combination mode will be described with reference to FIGS. 16, 17, and 18.

Figure 16:
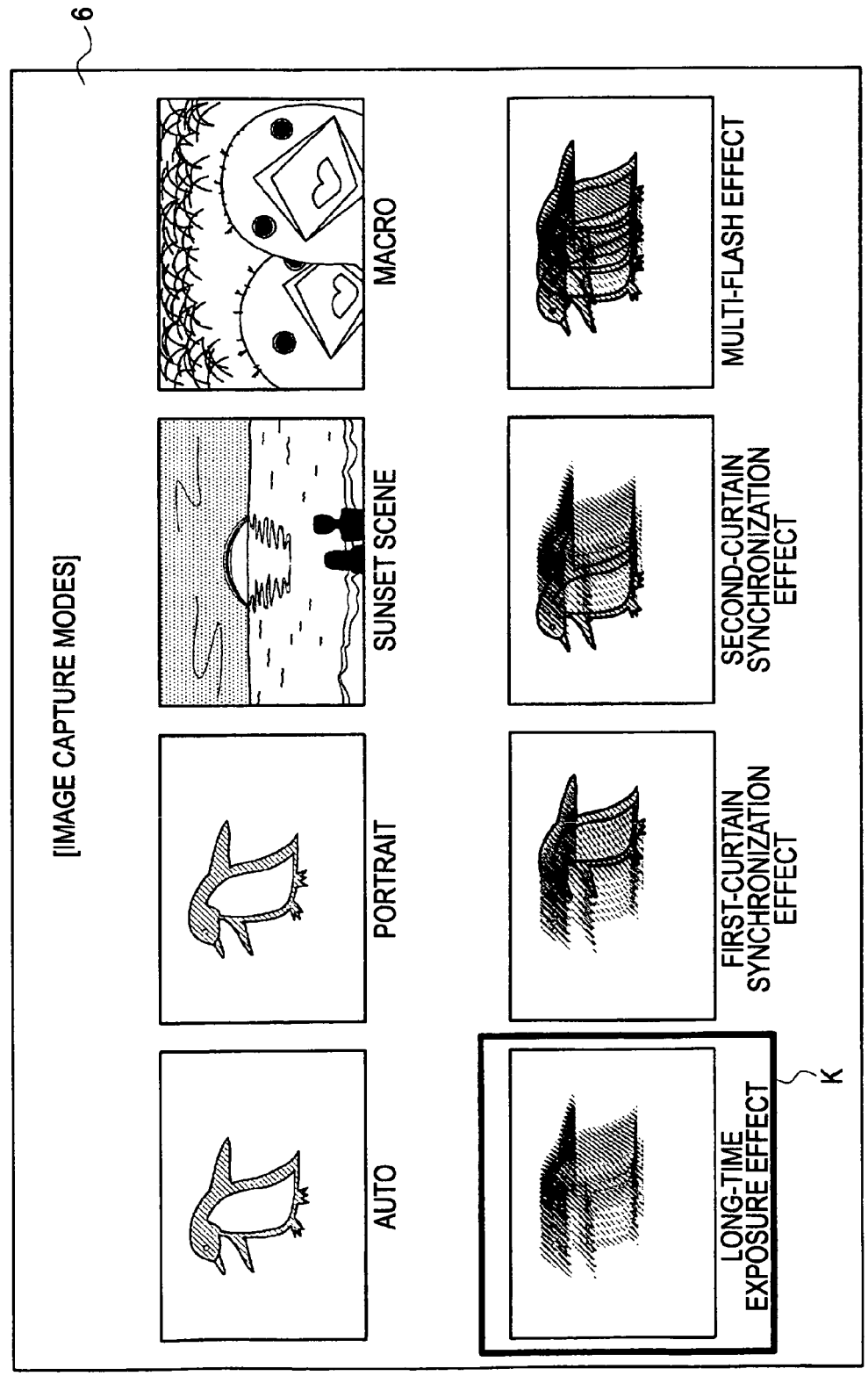
FIG. 16 is a diagram describing another image capture mode selection screen according to the embodiment.

FIG. 16 shows an image capture mode selection screen. In the exemplary operation described above, the "live-image combination mode" is selected on the selection screen shown in FIG. 3 to select an image capture mode. In this exemplary operation, as shown in FIG. 16, in addition to the normal image capture modes (such as the auto mode and the portrait mode), additional modes, namely, "long-time exposure effect", "first-curtain synchronization effect", "second-curtain synchronization effect", and "multi-flash effect", are available for selection in advance. A user operates a cursor K to select a desired image capture mode.

Figure 17:
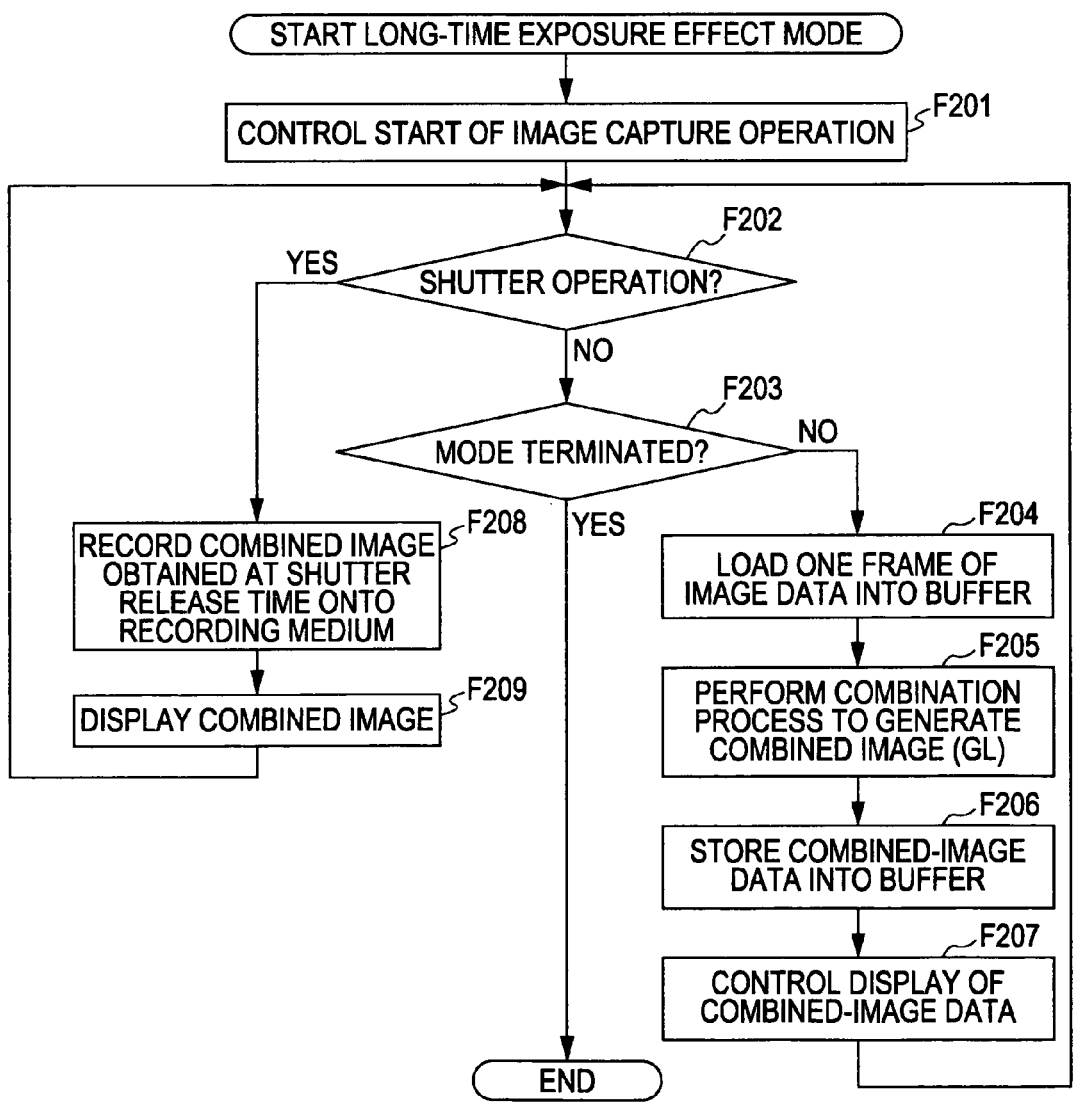
FIG. 17 is a flowchart showing another live-image combination mode process according to the embodiment.

For example, as shown in FIG. 16, when the cursor K is positioned on the "long-time exposure effect" mode and a mode setting operation is performed, the CPU 31 performs a long-time exposure effect mode process shown in FIG. 17.

The process shown in FIG. 17 will now be described.

For example, when a user performs an operation of selecting the "long-time exposure effect" mode, the CPU 31 starts the process shown in FIG. 17. First, in step F201, the CPU 31 controls the start of the image capture operation. The CPU 31 causes each unit of the image capture system 2 and the camera DSP 4 to start the image capture operation. Accordingly, frame-by-frame acquisition of image data for a subject image is started.

In step F202, the CPU 31 monitors a user's shutter operation. In step F203, the CPU 31 monitors a terminating operation of the long-time exposure effect mode. If none of those operations occurs, the CPU 31 proceeds to step F204.

In step F204, one frame of image data captured by the image capture system 2 and processed by the camera DSP 4 is loaded into the frame-image buffer area 32a of the RAM 32.

Then, the CPU 31 performs a combination process in step F205, buffering of combined-image data in step F206, and display control of the combined-image data in step F207. Then, the CPU 31 performs the processing of steps F204 to F207 again through steps F202 and F203.

That is, for a period before the shutter operation has been performed, the CPU 31 performs the processing of steps F204 to F207 every frame period. The current frame of image data and a predetermined number of preceding frames of image data are buffered into the frame-image buffer area 32a of the RAM 32 in accordance with the capacity of the frame-image buffer area 32a.

The processing of steps F205 to F207 is performed as follows by way of example.

First, in step F205, a combination process is performed using the most recent frame of image data (the frame of image data loaded in step F204) and a predetermined number of preceding frames of image data among the frames of image data temporarily stored in the frame-image buffer area 32a at the current time.

In this case, combined-image data for achieving the long-time exposure effect is generated as combined-image data GL.

Then, in step F206, the CPU 31 temporarily stores the combined-image data GL into the combined-image buffer area 32b of the RAM 32.

Then, in step F207, the CPU 31 outputs the combined-image data GL to the display controller 7 as display data, and causes the display panel 6 to execute predetermined monitor display.

The process described above is continued until a shutter operation has been performed or until the operation of terminating the long-time exposure effect mode (the operation of switching to another mode) has been performed.

The processing of steps F204 to F207 is repeated for a period of time during which the user is looking for a shooting opportunity. In other words, the user is waiting for a shooting opportunity while viewing the display panel 6.

According to the processing of step F207, the combined-image data GL of the long-time exposure effect is supplied to the display controller 7 every frame period as data used for display. For example, the display controller 7 causes the display panel 6 to perform display shown in, for example, FIG. 18 using the combined-image data GL.

In this case, an image corresponding to the combined-image data GL is displayed in full screen.

Further, a combination setting indication 66, for example, a combination time, is displayed.

Thus, the user can actually view an image that will be obtained as a result of applying the long-time exposure effect while waiting for a shooting opportunity.

The user performs a shutter operation at a desired timing while viewing a monitor image of a subject scene to which the long-time exposure effect is applied in real time, which is displayed on the display panel 6.

When a user's shutter operation is detected, the CPU 31 advances the process from step F202 to step F208 and performs a process of recording a combined image obtained at the time of shutter release onto the recording medium 90. The combined image obtained at the time of shutter release may be the combined-image data GL that has been generated in step F205 immediately before the detection of the shutter operation and that has been temporarily stored in step F206.

The CPU 31 transfers this combined image GL(x) of the long-time exposure effect to the media interface 10 to store the combined image GL(x) onto the recording medium 90.

Thus, the user can save a combined image of the long-time exposure effect for a desired scene as one photograph (still image).

In step F209, the CPU 31 controls the display controller 7 to display the combined-image data recorded onto the recording medium 90 on the display panel 6 for a predetermined period of time so as to allow the user to check the captured image.

Then, when the display is completed, the processing of steps F202 to F207 resumes.

Therefore, the image of the long-time exposure effect is displayed in a real-time monitor image again so that the user can look for a next shooting opportunity.

When a user's operation of terminating the long-time exposure effect mode is detected in step F203, the CPU 31 ends the process shown in FIG. 17.

The process of recording the captured image in step F208 may also be performed as follows by way of example.

While the combined image obtained at the time of shutter release is implemented by the combined-image data that has been generated in step F205 immediately before the time of shutter release, for example, frames including a frame obtained immediately after a shutter operation is detected in step F202 may be used to generate combined-image data GL and the combined-image data GL may be recorded onto the recording medium 90 as combined-image data obtained at the time of shutter release.

Further, in addition to the combined image obtained at the time of shutter release, a plurality of pieces of combined-image data GL obtained within a certain time range, which have been temporarily saved in the combined-image buffer area 32b at the current time, may be recorded onto the recording medium 90.

Further, in addition to the combined-image data GL, the image data buffered in the frame-image buffer area 32a, for instance, a plurality of frames of image data from which the combined-image data GL to be recorded is generated, may also be recorded onto the recording medium 90.

While, in the process shown in FIG. 17, the user selects the long-time exposure effect mode, a process similar to that shown in FIG. 17 may be performed when the user selects one of the first-curtain synchronization effect mode, the second-curtain synchronization effect mode, and the multi-flash effect mode. For example, when the user selects the first-curtain synchronization effect mode, combined-image data GS of the first-curtain synchronization effect may be generated in the combination process in step F205, and the display based on the combined-image data GS of the first-curtain synchronization effect may be provided in step F207 in the manner shown in FIG. 18.

According to the present exemplary process described above, a combined image to which an image effect selected by a user is applied is generated and displayed. This allows the user to look for a shooting opportunity while viewing the monitor display produced by applying the image effect selected by the user before the user performs image capture (or performs a shutter operation). Therefore, a captured image to which a desired image effect is applied can be easily obtained.

In particular, the processing load on the CPU 31 can be greatly reduced compared with the process described with reference to FIG. 4. This is because only a specific type of combined-image data selected by the user in advance is generated and displayed.

Also in this exemplary process, the processing of steps F205 to F207 may not necessarily be performed every frame period. For example, the processing of steps F205 to F207 may be performed intermittently such as once a two-frame frame or once a three-frame period. In particular, in a case where it is difficult to speed up the time involved in the combination process, the processing of steps F205 to F207 is preferably performed intermittently.

In a case where the time involved in the combination process is long, image data corresponding to a time longer than the time involved in the combination process may be accumulated in the frame-image buffer area 32a.

Furthermore, in order to further reduce the processing load on the CPU 31 for the combination process and the combined-image data display process, the processing of steps F205 to F207 may be implemented by generating and displaying low-resolution combined-image data.

Figure 18:
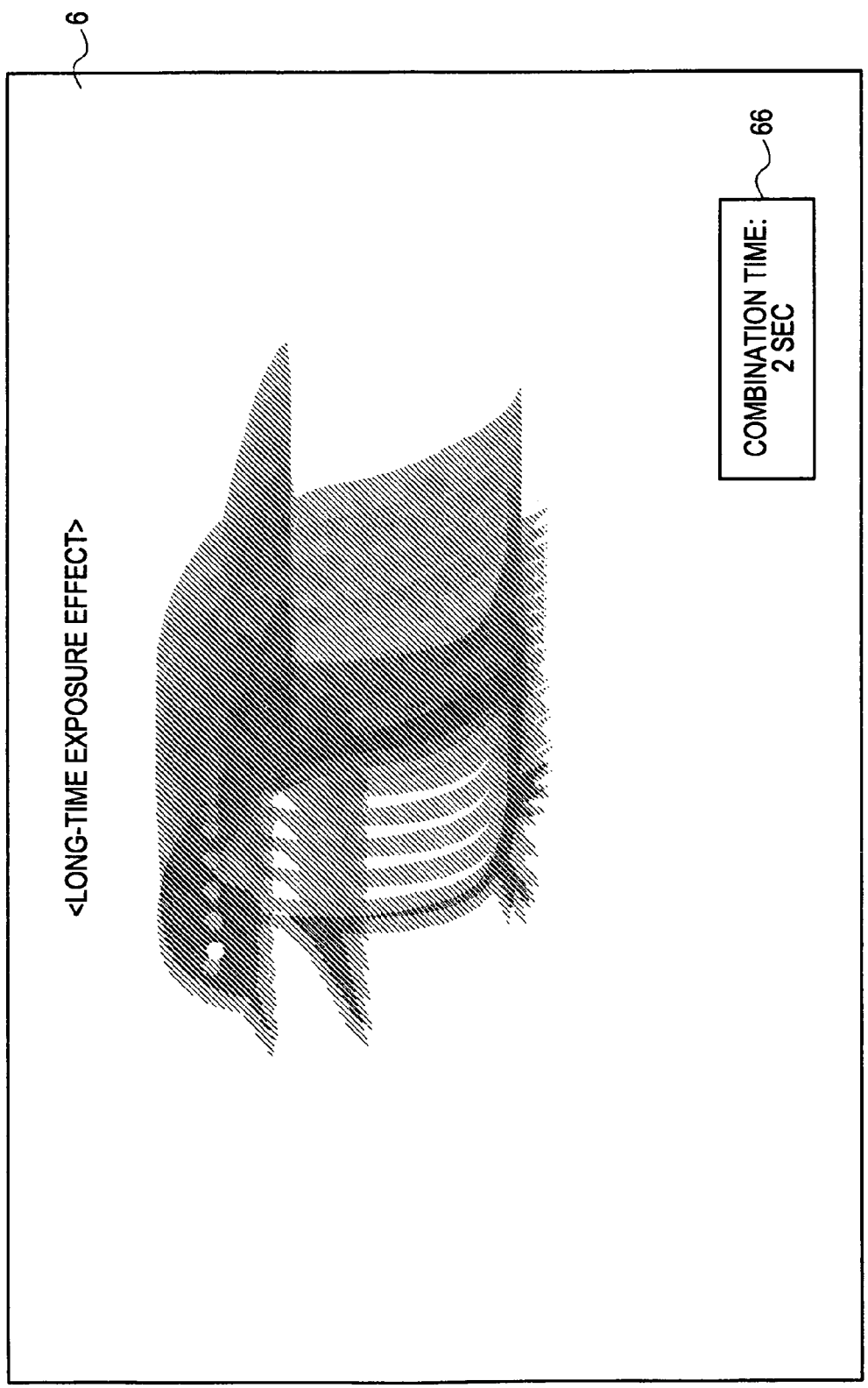
FIG. 18 is a diagram showing an image that is displayed in the live-image combination mode according to the embodiment.

Further, while the display shown in FIG. 18 described above is produced on the display panel 6, for example, display image data may be transferred from the external interface 8 to an external display device and the images shown in FIG. 18 may be displayed on the display device.

4. Exemplary Operation in Special Moving-Image Capture Mode

Next, an exemplary operation for performing special moving-image capture will be described with reference to FIGS. 19 and 20. The term "special moving-image capture" as used herein refers to recording of an image of the long-time exposure effect or the like as a moving image. In the exemplary operations described above, combined-image data with applied effects such as the long-time exposure effect is displayed every frame period so that a special effect can be applied on the moving image monitor display of a subject scene. The recording of such a moving image with an effect applied onto the recording medium 90 is referred to as "special moving-image capture".

The difference between normal moving-image capture and special moving-image capture will be described with reference to FIGS. 20A and 20B.

FIG. 20B shows normal moving-image capture. In the normal moving-image capture, each of captured frame images #1, #2, #3, etc., is data of one of frames forming a moving image.

In the special moving-image capture of the present exemplary operation, on the other hand, as shown in FIG. 20A, for example, each of the combined-image data GL1, GL2, GL3, etc., with the long-time exposure effect applied described above is data of one of frames forming a moving image.

By performing the special moving-image recording as shown in FIG. 20A, moving images with applied special effects such as the long-time exposure effect, the first-curtain synchronization effect, the second-curtain synchronization effect, and the multi-flash effect can be recorded.

Figure 19:
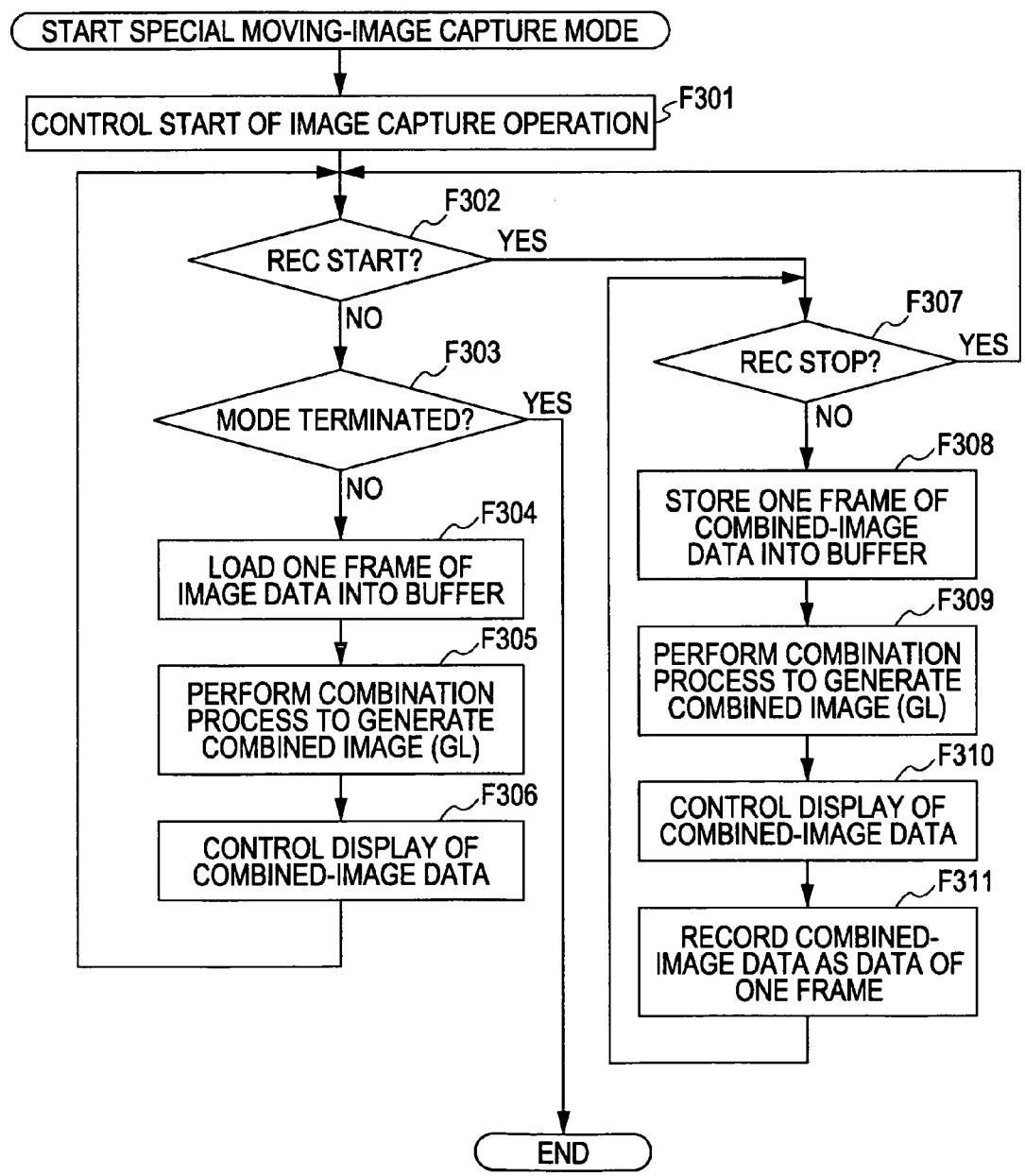
FIG. 19 is a flowchart showing a special moving-image capture mode process according to the embodiment.

FIG. 19 shows an exemplary process of the CPU 31 when the special moving-image capture mode is set.

Here, a user performs a mode selection operation of performing special moving-image recording of the "long-time exposure effect", by way of example.

First, in step F301, the CPU 31 controls the start of the image capture operation. The CPU 31 causes each unit of the image capture system 2 and the camera DSP 4 to start the image capture operation. Accordingly, frame-by-frame acquisition of image data for a subject image is started.

In step F302, the CPU 31 monitors a user's recording start operation. In step F303, the CPU 31 monitors a terminating operation of the special moving-image capture mode. If none of those operations occurs, the CPU 31 proceeds to step F304.

In step F304, one frame of image data captured by the image capture system 2 and processed by the camera DSP 4 is loaded into the frame-image buffer area 32a of the RAM 32.

Then, the CPU 31 performs a combination process in step F305, and display control of combined-image data in step F306. Then, the CPU 31 performs the processing of steps F304 to F306 again through steps F302 and F303.

That is, for a period before the recording start operation has been performed (during a recording standby period), the CPU 31 performs the processing of steps F304 to F306 every frame period.

In step F305, a combination process is performed using the most recent frame of image data (the frame of image data loaded in step F304) and a predetermined number of preceding frames among the frames of image data temporarily stored in the frame-image buffer area 32a at the current time. In this case, combined-image data for achieving the long-time exposure effect is generated as combined-image data GL.

Then, in step F306, the CPU 31 outputs the combined-image data GL to the display controller 7 as display data, and causes the display panel 6 to execute predetermined monitor display.

By repeating the process described above during the recording standby period, the combined-image data GL of the long-time exposure effect is supplied to the display controller 7 every frame period as data used for display.

The display controller 7 causes the display panel 6 to perform display shown in, for example, FIG. 18 using the combined-image data GL.

The user is looking for an opportunity to start recording while monitoring such a moving image of a subject scene to which the long-time exposure effect is applied.

When a user's recording start operation is detected, the CPU 31 proceeds from step F302 to step F307 and repeats the processing of steps F308 to F311 until a recording end operation has been detected.

In step F308, one frame of image data captured by the image capture system 2 and processed by the camera DSP 4 is loaded into the frame-image buffer area 32a of the RAM 32.

In step F309, a combination process is performed using the most recent frame of image data (the frame of image data loaded in step F308) and a predetermined number of preceding frames of image data among the frames of image data temporarily stored in the frame-image buffer area 32a at the current time. In this case, combined-image data for achieving the long-time exposure effect is generated as combined-image data GL.

In step F310, the CPU 31 outputs the combined-image data GL to the display controller 7 as display data, and causes the display panel 6 to execute predetermined monitor display.

Then, in step F311, the combined-image data GL is transferred to the media interface 10 as data of one of frames forming a moving image, and is recorded onto the recording medium 90.

Accordingly, for a period of time from when the recording start operation is performed to when the recording end operation is performed, as shown in FIG. 20A, moving-image recording is performed using a piece of combined-image data GL as data of one frame.

When a recording end operation is detected in step F307, the CPU 31 returns to step F302. Then, the CPU 31 performs the process of the standby period described above.

When a user's operation of terminating the long-time exposure effect mode is detected in step F303, the CPU 31 ends the process shown in FIG. 19.

With the process described above, the recording of a moving image to which the long-time exposure effect is applied is implemented. Therefore, the user can easily implement moving-image capture which is not achieved in the related art.

Further, by playing back a recorded moving image, the user can enjoy a moving image to which the long-time exposure effect or the like is applied.

FIG. 19 shows a process for special moving-image capture based on the long-time exposure effect. A process similar to that shown in FIG. 19 may be performed to realize special moving-image capture in the first-curtain synchronization effect mode, the second-curtain synchronization effect mode, or the multi-flash effect mode. For example, in the case of the first-curtain synchronization effect mode, combined-image data GS of the first-curtain synchronization effect may be generated in the combination process in step F305 or F309, and the display based on the combined-image data GS of the first-curtain synchronization effect may be provided in step F306 or F310 in the manner shown in FIG. 18. In step F311, the combined-image data GS of the first-curtain synchronization effect may be recorded as one frame of a moving image.

Note that, together with a moving image based on combined-image data, a normal moving image as shown in FIG. 20B may be recorded onto the recording medium 90.

Further, while the display shown in FIG. 18 described above is produced on the display panel 6, for example, display image data may be transferred from the external interface 8 to an external device and the images shown in FIG. 18 may be displayed on the display device.

Further, special moving-image data may be recorded onto, instead of the recording medium 90, the flash ROM 33 or the like.

In the moving image capture described above, a user performs a recording start operation and a recording end operation. The recording start operation and the recording end operation may be implemented, for example, as follows:

(1) The user performs a shutter operation to perform a recording start operation, and performs a shutter operation again to perform a recording end operation.

(2) Recording is performed for a period during which the user continuously performs a shutter operation (or is pressing a shutter button). That is, the user starts a shutter operation to perform a recording start operation, and releases the shutter button to perform a recording end operation.

5. Application Example to Information Processing Apparatus

In the foregoing embodiment, an image capture and combination processes are performed using the image capture apparatus 1. In an embodiment of the present invention, an apparatus other than the image capture apparatus 1 may be used.

Figure 21:
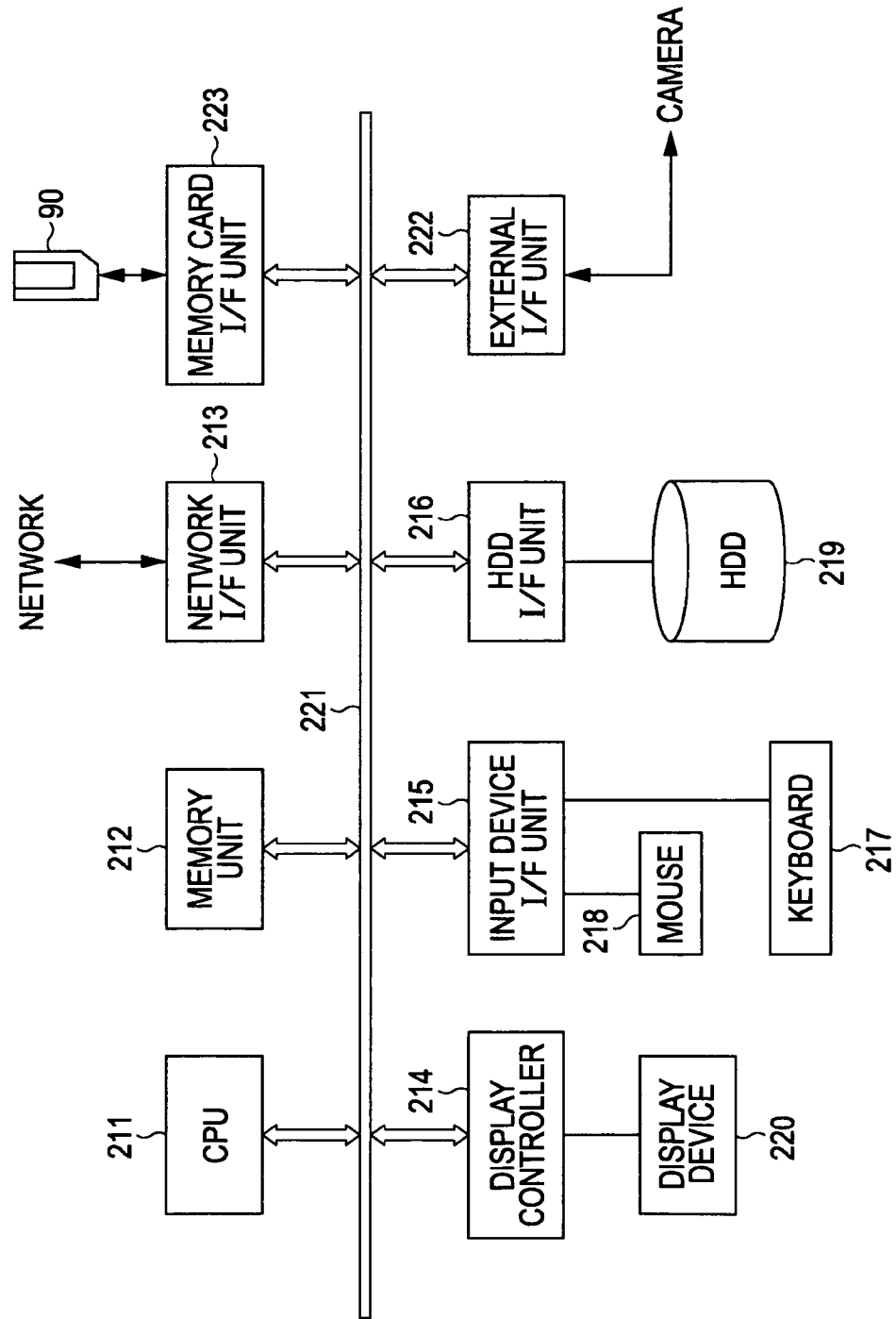
FIG. 21 is a block diagram of an information processing apparatus according to an embodiment of the present invention.

FIG. 21 shows an information processing apparatus according to another embodiment of the present invention, for example, a personal computer (hereinafter referred to as a "PC") 200.

As shown in FIG. 21, the PC 200 includes a central processing unit (CPU) 211, a memory unit 212, a network interface unit 213, a display controller 214, an input device interface unit 215, a hard disk drive (HDD) interface unit 216, a keyboard 217, a mouse 218, an HDD 219, a display device 220, a bus 221, an external device interface unit 222, and a memory card interface unit 223.

The CPU 211 serves as a main controller of the PC 200, and executes various control processes according to a program stored in the memory unit 212. The CPU 211 is connected to other units via the bus 221.

Each of the devices on the bus 221 has a unique memory address or an input/output (I/O) address, and the CPU 211 can use the addresses to access the devices. An example of the bus 221 may be a peripheral component interconnect (PCI) bus.

The memory unit 212 is configured to include both a volatile memory and a non-volatile memory. The memory unit 212 includes a non-volatile memory such as a ROM for storing a program, a RAM used as a computation work area or temporary storage of various data, and an electrically erasable and programmable read only memory (EEPROM).

The memory unit 212 is used to store program code executed by the CPU 211 or other information such as identification information unique to the PC 200, or is used as a buffer area for storing communication data or as a work area for work data while it is executed.

The network interface unit 213 connects the PC 200 to a network such as the Internet or a local area network (LAN) according to a predetermined communication protocol such as Ethernet (registered trademark). The CPU 211 can communicate with apparatuses connected to the network via the network interface unit 213.

The display controller 214 is a dedicated controller for actually processing rendering commands issued by the CPU 211. For example, the display controller 214 supports a bit-map rendering function corresponding to the Super Video Graphic Array (SVGA) or extended Graphic Array (XGA) standard. The rendering data processed in the display controller 214 is temporarily written into, for example, a frame buffer (not shown), and is then output to the display device 220. The display device 220 may be, for example, an organic EL display, a cathode ray tube (CRT) display, a liquid crystal display, or the like.

The input device interface unit 215 is a device for connecting a user input device including the keyboard 217 and the mouse 218 to a computer system implemented as the PC 200.

Specifically, a user operation input to the PC 200 is performed using the keyboard 217 and the mouse 218, and the operation input information is supplied to the CPU 211 via the input device interface unit 215.

The HDD interface unit 216 performs an interface process for performing writing/reading on the HDD 219.

The HDD 219 is an external storage device in which a magnetic disk serving as a storage medium is fixedly mounted, as is common in the art, and has a larger storage capacity and a higher data transfer rate than other external storage devices. Placing a software program onto the HDD 219 in an executable state is referred to as "installing" the program into the system. In general, the HDD 219 stores program code of an operating system (OS) executed by the CPU 211, application programs, device drivers, etc., in a non-volatile state.

The programs stored in the HDD 219 are developed in the memory unit 212, for example, when the PC 200 is started or when an application program for the user layer is started. The CPU 211 performs a process based on the program developed in the memory unit 212.

The external device interface unit 222 is configured to interface with an external device connected according to a standard such as the USB standard.

In the present embodiment, examples of external devices may include, for example, a digital still camera, a video camera, and a video player.

The PC 200 can acquire image data from a digital still camera or the like through communication via the external device interface unit 222.

The standard supported by the external device interface unit 222 is not limited to the USB standard but may be any other interface standard such as the Institute of Electrical and Electronics Engineers (IEEE) 1394.

The memory card interface unit 223 is configured to write/read data into/from a recording medium 90 such as a memory card.

For example, the recording medium 90, which is used for a digital still camera, for example, the image capture apparatus 1 described above, a video camera, or the like, is placed. Then, image data can be read from the recording medium 90.

In the PC 200 having the structure described above, an arithmetic processing/control operation based on the software configuration in the CPU 211, namely, software such as the application programs, the OS, and the device drivers, is performed to execute various operations.

In the present embodiment, the operations include, for example, processes shown in FIGS. 22 and 23 described below. A program for performing the processes is installed into, for example, the HDD 219 and is developed into the memory unit 212 when it is started. The CPU 211 executes necessary arithmetic processes or control processes according to the program developed into the memory unit 212 to implement the processes shown in FIGS. 22 and 23.

Figure 22:
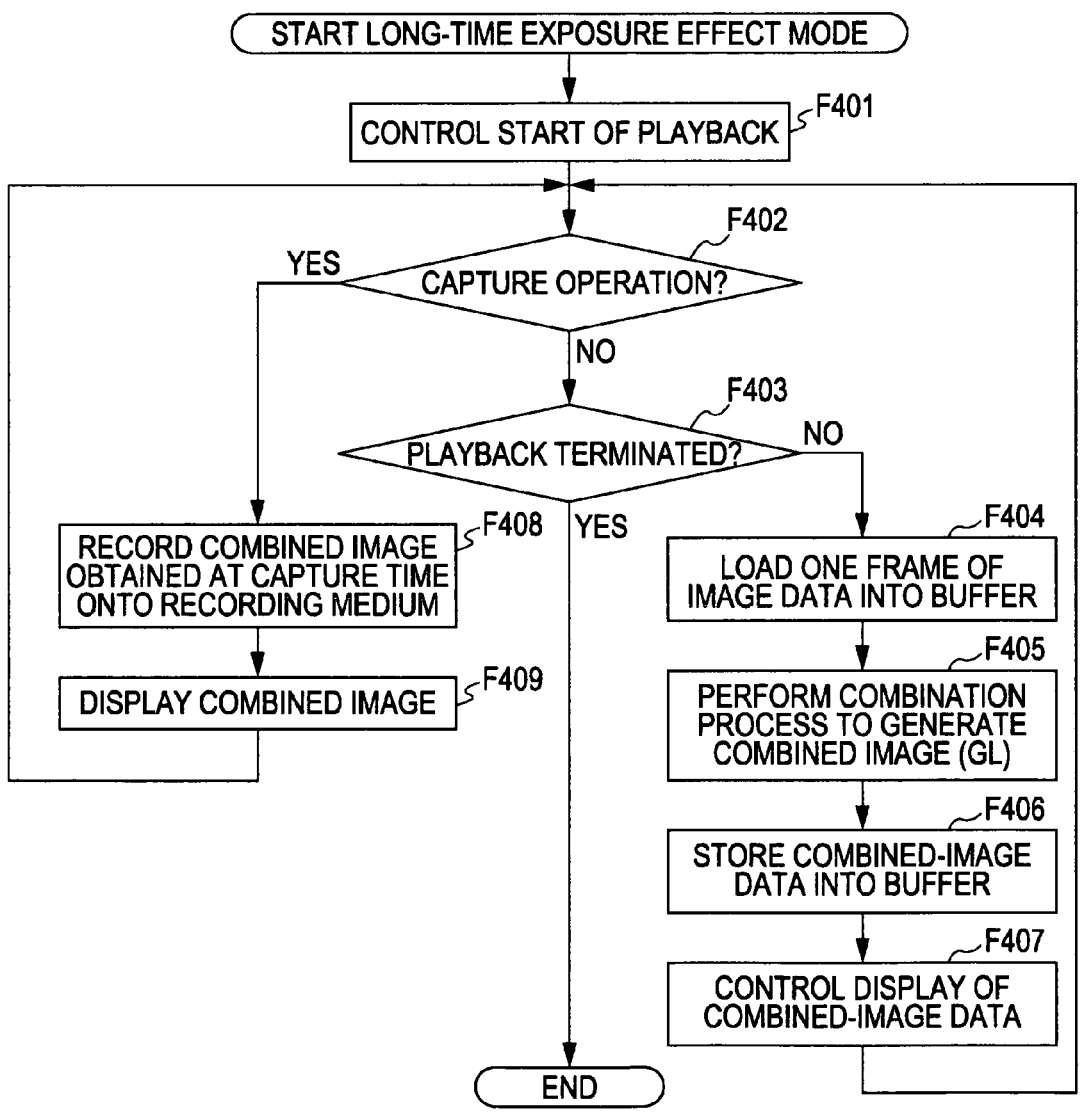
FIG. 22 is a flowchart showing a long-time exposure effect mode process performed in the information processing apparatus according to the embodiment.
Figure 23:
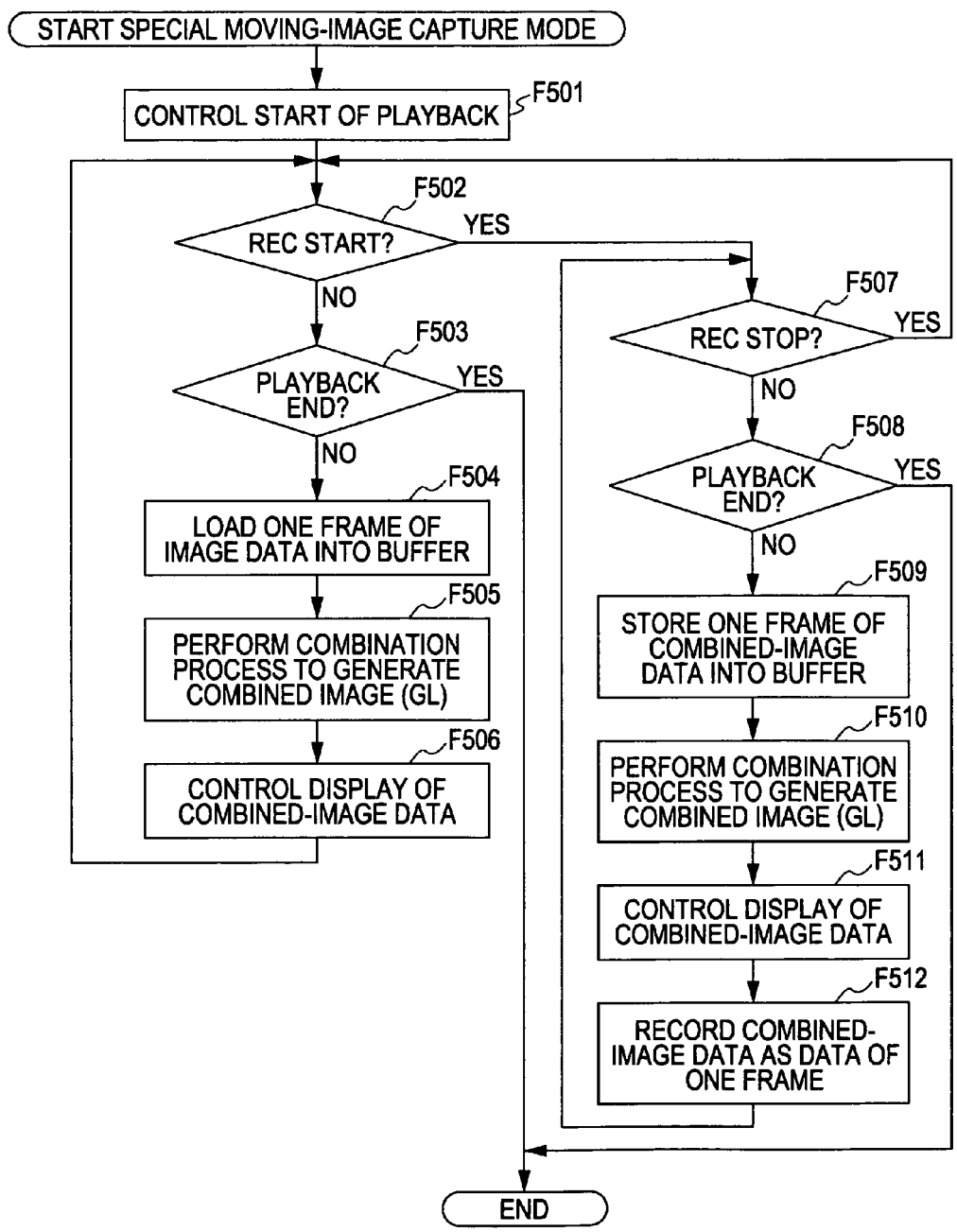
FIG. 23 is a flowchart showing a special moving-image recording mode process performed in the information processing apparatus according to the embodiment.

A program for causing the CPU 211 to execute processes such as the processes shown in FIGS. 22 and 23 can be recorded in advance on an HDD serving as a recording medium incorporated in an apparatus such as the PC 200, or a ROM, a flash memory, or the like in a microcomputer having a CPU.

Alternatively, the program can be temporarily or permanently stored (recorded) on a removable recording medium such as a flexible disk, a compact disc read only memory (CD-ROM), a magnet-optical (MO) disk, a digital versatile disc (DVD), a Blu-ray disk, a magnetic disk, a semiconductor memory, or a memory card. Such removable recording media can be provided as so-called packaged software.

The program may also be downloaded from a download site via a network such as a LAN or the Internet as well as installed into a personal computer or the like from a removable recording medium.

In the PC 200 having the structure described above, for example, the HDD 219 can store various types of image content. For example, image content captured by a user using a digital still camera or a video camera may be loaded and stored into the HDD 219. Thus, the user can enjoy the captured image played back using the PC 200.

For example, the external interface unit 222 of the PC 200 may be connected to the external interface 8 of the image capture apparatus 1 so that image data captured using the image capture apparatus 1 can be transferred to and loaded into the PC 200.

The recording medium 90 (memory card) used in the image capture apparatus 1 may also be placed in the memory card interface unit 223 so that the PC 200 can acquire image data captured using the image capture apparatus 1 from the recording medium 90.

In addition to image content captured by the user, for example, image content played back using an external video player or the like and acquired from the external interface unit 222 or image content downloaded from an external server via a network using the network interface unit 213 can also be stored in the HDD 219 and played back.

In the present embodiment, when moving image content is to be played back, the process shown in FIGS. 22 and 23 is performed to record still-image data of a long-time exposure effect image or the like or to record the special moving-image data described above.

The term "moving image content" as used herein refers to any type of moving-image data that can be played back on the PC 200.

Examples of the moving image content include moving-image data captured using a video camera or a digital still camera having a moving image capture function and loaded into the PC 200, moving-image data downloaded over a network, and moving-image data recorded on the recording medium 90.

Further examples of the moving image content include moving-image data recorded on an optical disk such as a DVD or a Blu-ray disk when a DVD drive, a Blu-ray disk drive, or the like, which is not shown in FIG. 21, is connected to the PC 200, and moving-image data of broadcast content when a television broadcast tuner or the like is incorporated in or connected to the PC 200. Further examples of the moving image content include moving-image data input from a video player or the like connected to the PC 200.

That is, any moving-image data that can be played back using the PC 200 and that can be displayed on the display device 220 may be "moving image content", which will be described below, regardless of the type of the moving-image data.

When moving image content is played back, the CPU 211 executes the process shown in FIG. 22. Thus, the user can generate image data (still-image data) with applied effects such as the long-time exposure effect, the first-curtain synchronization effect, the second-curtain synchronization effect, and the multi-flash effect, and can record (save) the generated image data.

The process shown in FIG. 22 will now be described.

Here, a user enters an instruction to perform an operation in the "long-time exposure effect" mode by way of example. In this case, the CPU 211 starts the process shown in FIG. 22. First, in step F401, the CPU 211 controls the start of playback. For example, the CPU 31 controls the start of playback of moving image content recorded on the HDD 219 or the like. The term "playback" as used herein refers to not only reading of moving image content from the HDD 219 or the like but also other types of playback such as streaming playback over a network, playback display of an image input from an external device, and playback display of a moving image of a television broadcast received at a tuner incorporated in the PC 200.

In step F402, the CPU 211 monitors a user's capture operation. In step F403, the CPU 211 monitors the end of playback. The end of playback includes the end of playback due to the completion of playback of moving image content and the end of playback in accordance with a playback end operation performed by the user.

For a period during which the playback is in progress, the CPU 211 proceeds to step F404.

In step F404, one frame of image data obtained by playback is buffered. One frame of image data is stored in, for example, a frame-image buffer area formed in the memory unit 212.

Then, the CPU 211 performs a combination process in step F405, buffering of combined-image data in step F406, and display control of the combined-image data in step F407.

Then, the CPU 211 performs the processing of steps F404 to F407 again through steps F402 and F403.

That is, for a period before a capture operation has been detected, the CPU 211 performs the processing of steps F404 to F407 every frame period. In the frame-image buffer area of the memory unit 212, the current frame of image data and a predetermined number of preceding frames of image data for the moving image content being played back are buffered.

The processing of steps F405 to F407 is performed as follows by way of example.

First, in step F405, a combination process is performed using the most recent frame of image data (the frame of image data loaded in step F404) and a predetermined number of preceding frames of image data among the frames of image data temporarily stored in the frame-image buffer area of the memory unit 212 at the current time.

In this case, combined-image data for achieving the long-time exposure effect is generated as combined-image data GL.

Then, in step F406, the CPU 211 temporarily stores the combined-image data GL into the combined-image buffer area formed in the memory unit 212.

Then, in step F407, the CPU 211 outputs the combined-image data GL to the display controller 214 as display data to display an image corresponding to the combined-image data GL on the display device 220.

With this process, instead of normal playback display of the moving image content, moving image playback display in which each frame has the long-time exposure effect applied thereto is performed on the display device 220.

The user looks for a capture opportunity while viewing the screen of the display device 220.

When a user's capture operation is detected, the CPU 211 advances the process from step F402 to step F408 and performs a process of recording a combined image obtained at the time of capture. The combined image is recorded onto, for example, the HDD 219 or the recording medium 90.

The combined image obtained at the time of capture may be the combined-image data GL that has been generated in step F405 immediately before the detection of the capture operation and that has been temporarily stored in step F406.

Thus, the user can save an image of a desired scene as a piece of still-image data while viewing played back images of the long-time exposure effect.

In step F409, the CPU 211 controls the display controller 214 to display the combined-image data recorded onto the HDD 219 or the like on the screen of the display device 220 for a certain period of time so as to allow the user to check the captured image.

Then, when the display is completed, the processing of steps F402 to F407 resumes.

When the end of playback is detected in step F403, the CPU 211 ends the process shown in FIG. 22.

FIG. 22 shows a process when a user selects the long-time exposure effect mode. A process similar to that shown in FIG. 22 may be performed when the user selects the first-curtain synchronization effect mode, the second-curtain synchronization effect mode, or the multi-flash effect mode. For example, when the user selects the first-curtain synchronization effect mode, combined-image data GS of the first-curtain synchronization effect may be generated in the combination process in step F405, and the display based on the combined-image data GS of the first-curtain synchronization effect may be provided in step F407.

According to the process described above, a user can obtain a combined image of a certain scene to which a selected image effect is applied while selecting and playing back desired moving image content. Therefore, the user can easily generate and enjoy various images.

In addition to the exemplary process described above, as described with reference to FIG. 4, the process of displaying images of multiple image effects at the same time may be performed.

Next, the process shown in FIG. 23 will be described.

Here, a process for performing special moving-image recording of the "long-time exposure effect" will be described.

First, in step F501, the CPU 211 controls the start of playback of moving image content. In step F502, the CPU 211 monitors a user's recording start operation. In step F503, the CPU 211 monitors the end of playback of the moving image content. For a period before a recording start operation has been performed, the CPU 211 proceeds to step F504. In step F504, the CPU 211 loads one frame of image data of the moving image content being played back into the frame-image buffer area of the memory unit 212.

In step F505, a combination process is performed using the most recent frame of image data (the frame of image data loaded in step F504) and a predetermined number of preceding frames of image data among the frames of image data temporarily stored in the frame-image buffer area of the memory unit 212 at the current time.

In this case, combined-image data for achieving the long-time exposure effect is generated as combined-image data GL.

Then, in step F506, the CPU 211 outputs the combined-image data GL to the display controller 214 as display data to display and image corresponding to the combined-image data GL on the display device 220.

For a period before the recording start operation has been performed (during a recording standby period), the CPU 211 performs the processing of steps F504 to F506 every frame period. Thus, instead of normal playback display of the moving image content, moving image playback display in which each frame has the long-time exposure effect applied thereto is performed on the display device 220.

When a user's recording start operation is detected, the CPU 211 proceeds from step F502 to step F507 and repeats the processing of steps F509 to F512 until a recording end operation has been detected or until the end of playback has been detected in step F508.

In step F509, one frame of image data of the moving image content being played back is loaded into the frame-image buffer area of the memory unit 212.

In step F510, a combination process is performed using the most recent frame of image data (the frame of image data loaded in step F509) and a predetermined number of preceding frames of image data among the frames of image data temporarily stored in the frame-image buffer area of the memory unit 212 at the current time to generate combined-image data for achieving the long-time exposure effect as combined-image data GL.

In step F511, the CPU 211 outputs the combined-image data GL to the display controller 214 as display data to display an image corresponding to the combined-image data GL on the display device 220.

Then, in step F512, the combined-image data GL is recorded onto, for example, the HDD 219 as data of one of frames forming a moving image.

Accordingly, for a period of time from when the recording start operating is performed to when the recording end operation is performed, as shown in FIG. 20A, moving image recording is performed using a piece of combined-image data GL as data of one frame.

When a recording end operation is detected in step F507, the CPU 31 returns to step F302. Then, the CPU 31 performs the process of the standby period described above.

Further, when the end of playback is detected in step F503 or F508, the CPU 31 ends the process shown in FIG. 23.

With the process described above, moving image recording in which the long-time exposure effect is applied to the moving image content currently being played back is implemented. Therefore, the user can create moving image content, which is not achieved in the related art.

Further, by playing back a recorded moving image, the user can enjoy a moving image with the long-time exposure effect or the like.

FIG. 23 shows a process for special moving-image recording based on the long-time exposure effect. A process similar to that shown in FIG. 23 may be performed to realize special moving-image recording in the first-curtain synchronization effect mode, the second-curtain synchronization effect mode, or the multi-flash effect mode. For example, in the case of the first-curtain synchronization effect mode, combined-image data GS of the first-curtain synchronization effect may be generated in the combination process in step F505 or F510, and the display based on the combined-image data GS of the first-curtain synchronization effect may be provided in step F506 or F511. In step F512, the combined-image data GS of the first-curtain synchronization effect may be recorded as one frame of a moving image.

Therefore, moving-image content can be played back using the PC 200 to create still-image data or moving-image data to which an image effect such as the long-time exposure effect is applied from the moving-image content.

In the present embodiment, a personal computer is used as an information processing apparatus by way of example. Other various information processing apparatuses that use image data, such as a mobile phone, a personal digital assistant (PDA), a game unit, and a video editor, can execute image combination in a manner similar to that described above.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   an image obtaining unit configured to perform an image obtaining operation to obtain a plurality of frames of image data having continuity in time;
   a storage unit configured to temporarily store each of the plurality of frames of image data obtained by the image obtaining unit during the image obtaining operation; and
   an arithmetic operation control unit configured to perform an image combination process using the plurality of frames of image data stored in the storage unit during the image obtaining operation to generate combined-image data, the combined-image data being used as data used for display,
   wherein the arithmetic operation control unit assigns a high weighting coefficient to at least a first frame of the frames of image data and a low weighting coefficient to at least a second frame of the frames of image data and then combines at least the weighted frames of the image data to generate the combined-image data,
   wherein the at least first frame to which the high weighting coefficient is assigned and the at least second frame to which the low weighting coefficient is assigned are each determined from the frames of image data based on a selection of a flash effect desired in the combined-image data, and
   wherein the image combination process is performed when a live-image combination mode has been selected by a user via a screen displaying an image of a corresponding long-time exposure effect.

2. The image processing apparatus according to claim 1, wherein the arithmetic operation control unit performs, in accordance with a recording operation input, a process of recording combined-image data obtained at a time of the recording operation input onto a recording medium as still-image data.

3. The image processing apparatus according to claim 2, wherein the arithmetic operation control unit generates combined-image data using a predetermined number of frames of image data including a most recent frame of image data among a plurality of frames of image data that are stored for each predetermined period of time.

4. The image processing apparatus according to claim 3, wherein the at least first frame to which the high weighting coefficient is assigned includes a most recent frame of image data among frames of image data.

5. The image processing apparatus according to claim 3, wherein the at least first frame to which the high weighting coefficient is assigned includes an oldest frame of image data among frames of image data.

6. The image processing apparatus according to claim 3, wherein the at least first frame to which the high weighting coefficient is assigned includes a multiple number of the frames of image data.

7. The image processing apparatus according to claim 1, wherein the arithmetic operation control unit performs an image combination process using the plurality of frames of image data sequentially stored in the storage unit during the image obtaining operation to generate a plurality of types of combined-image data, the generated plurality of types of combined-image data being used as data used for display.

8. The image processing apparatus according to claim 7, wherein the arithmetic operation control unit performs, in accordance with a recording operation input, a process of recording at least some of a plurality of types of combined-image data generated at a time of the recording operation input onto a recording medium as still-image data.

9. The image processing apparatus according to claim 1, wherein the arithmetic operation control unit performs an image combination process using the plurality of frames of image data sequentially stored in the storage unit during the image obtaining operation to generate combined-image data, and records the generated combined-image data onto a recording medium as image data of one of frames forming a moving image.

10. The image processing apparatus according to claim 9, wherein the arithmetic operation control unit uses the recorded combined-image data as data used for display.

11. The image processing apparatus according to claim 1, wherein the image obtaining unit includes an image capture unit configured to perform an image capture operation to obtain a plurality of frames of image data having continuity in time.

12. The image processing apparatus according to claim 1, wherein the image obtaining unit includes a playback unit configured to perform a playback operation to obtain a plurality of frames of image data having continuity in time.

13. The image processing apparatus according to claim 1, wherein the image obtaining unit includes a receiving unit configured to perform a receiving operation to obtain a plurality of frames of image data having continuity in time.

14. The image processing apparatus according to claim 1, further comprising a display unit configured to display an image based on the combined-image data generated by the arithmetic operation control unit.

15. The image processing apparatus according to claim 1, further comprising a sending unit configured to send the combined-image data generated by the arithmetic operation control unit.

16. The image processing apparatus according to claim 1, wherein the arithmetic operation control unit generates combined-image data using a predetermined number of frames of image data including a most recent frame of image data among a plurality of frames of image data that are stored for each predetermined period of time, and uses the generated combined-image data as data used for display.

17. An image processing method, comprising:
   obtaining a plurality of frames of image data having continuity in time;
   temporarily storing each of the plurality of obtained frames of image data;
   performing an image combination process using the plurality of sequentially stored frames of image data to generate combined-image data,
   wherein the image combination process includes assigning a high weighting coefficient to at least a first frame of the frames of image data and a low weighting coefficient to at least a second frame of the frames of image data and then combining at least the weighted frames of image data to generate the combined-image data, the at least first frame to which the high weighting coefficient is assigned and the at least second frame to which the low weighting coefficient is assigned being determined from the frames of image data based on a selected flash effect desired in the combined-image data; and outputting the combined-image data as data used for display, wherein the image combination process is performed when a live-image combination mode has been selected by a user via a screen displaying an image of a corresponding long-time exposure effect.

18. A processor encoded with a computer program for executing an image processing method, the image processing method comprising:

obtaining a plurality of frames of image data having continuity in time;

temporarily storing each of the plurality of obtained frames of image data;

performing an image combination process using the plurality of sequentially stored frames of image data to generate combined-image data, wherein the image combination process includes assigning a high weighting coefficient to at least a first frame of the frames of image data and a low weighting coefficient to at least a second frame of the frames of image data and then combining at least the weighted frames of image data to generate the combined-image data, the at least first frame to which the high weighting coefficient is assigned and the at least second frame to which the low weighting coefficient is assigned being determined from the frames of image data based on a selected flash effect desired in the combined-image data; and outputting the combined-image data as data used for display, wherein the image combination process is performed when a live-image combination mode has been selected by a user via a screen displaying an image of a corresponding long-time exposure effect.

* * * * *